(12) United States Patent
Meza et al.

(10) Patent No.: US 8,549,229 B2
(45) Date of Patent: Oct. 1, 2013

(54) SYSTEMS AND METHODS FOR MANAGING AN UPLOAD OF FILES IN A SHARED CACHE STORAGE SYSTEM

(75) Inventors: Joseph R. Meza, Aliso Viejo, CA (US); Judah Gamliel Hahn, Ofra (IL); Henry Hutton, Tracy, CA (US); Leah Sherry, Milpitas, CA (US)

(73) Assignee: SanDisk IL Ltd., Kfar Saba (IL)

( * ) Notice: Subject to any disclaimer, the term of this patent is extended or adjusted under 35 U.S.C. 154(b) by 310 days.

(21) Appl. No.: 12/895,397

(22) Filed: Sep. 30, 2010

(65) Prior Publication Data

US 2012/0047331 A1 Feb. 23, 2012

Related U.S. Application Data

(60) Provisional application No. 61/401,841, filed on Aug. 19, 2010.

(51) Int. Cl.
*G06F 12/08* (2006.01)

(52) U.S. Cl.
USPC .................... 711/134; 711/118; 711/E12.022

(58) Field of Classification Search
USPC ................................... 711/134, 118, E12.022
See application file for complete search history.

(56) References Cited

U.S. PATENT DOCUMENTS

| 5,491,810 | A | 2/1996 | Allen |
| 5,754,939 | A | 5/1998 | Herz et al. |
| 5,790,886 | A | 8/1998 | Allen |
| 5,835,935 | A | 11/1998 | Estakhri et al. |
| 5,838,614 | A | 11/1998 | Estakhri et al. |
| 5,893,920 | A | 4/1999 | Shaheen et al. |
| 6,134,584 | A | 10/2000 | Chang et al. |
| 6,138,158 | A | 10/2000 | Boyle et al. |
| 6,185,625 | B1 | 2/2001 | Tso et al. |
| 6,217,752 | B1 | 4/2001 | Coots |
| 6,366,912 | B1 | 4/2002 | Wallent et al. |
| 6,393,465 | B2 | 5/2002 | Leeds |

(Continued)

FOREIGN PATENT DOCUMENTS

| CN | 101375579 | 9/2009 |
| EP | 0866590 | 8/1998 |

(Continued)

OTHER PUBLICATIONS

"Android Data Caching", Process Fork, http://processfork.blogspot.com/2010/04/android-data-caching.html, Apr. 21, 2010, 2 pages.

(Continued)

*Primary Examiner* — Yong Choe
(74) *Attorney, Agent, or Firm* — Brinks Hofer Gilson & Lione

(57) ABSTRACT

Systems and methods for managing a storage device are disclosed. Generally, in a host to which a storage device is operatively coupled, wherein the storage device includes a cache for storing one or more discardable files, a file is identified to be uploaded to an external location. A determination is made whether sufficient free space exists in the cache to pre-stage the file for upload to the external location and the file is stored in the cache upon determining that sufficient free space exists in the cache to pre-stage the file for upload to the external location, wherein pre-stating prepares a file for opportunistically uploading such file in accordance with an uploading policy.

28 Claims, 7 Drawing Sheets

(56) References Cited

U.S. PATENT DOCUMENTS

| | | |
|---|---|---|
| 6,453,383 B1 | 9/2002 | Stoddard et al. |
| 6,542,964 B1 | 4/2003 | Scharber |
| 6,542,967 B1 | 4/2003 | Major |
| 6,553,393 B1 | 4/2003 | Eilbott et al. |
| 6,598,121 B2 | 7/2003 | Challenger et al. |
| 6,742,033 B1 | 5/2004 | Smith et al. |
| 6,799,251 B1 | 9/2004 | Jacobs et al. |
| 6,826,599 B1 | 11/2004 | Shaffer et al. |
| 6,917,960 B1 | 7/2005 | Decasper et al. |
| 6,937,813 B1 | 8/2005 | Wilson |
| 6,996,676 B2 | 2/2006 | Megiddo et al. |
| 7,043,506 B1 | 5/2006 | Horvitz |
| 7,043,524 B2 | 5/2006 | Shah et al. |
| 7,103,598 B1 | 9/2006 | Clement |
| 7,136,885 B2* | 11/2006 | Wright et al. ............... 1/1 |
| 7,155,519 B2 | 12/2006 | Lo et al. |
| 7,167,840 B1 | 1/2007 | Seidman et al. |
| 7,246,139 B2 | 7/2007 | Andoh |
| 7,246,268 B2 | 7/2007 | Craig et al. |
| 7,248,861 B2 | 7/2007 | Lazaridis et al. |
| 7,269,851 B2 | 9/2007 | Ackroyd |
| 7,289,563 B2 | 10/2007 | Yamamoto |
| 7,305,473 B2 | 12/2007 | Vogt |
| 7,317,907 B2 | 1/2008 | Linkert et al. |
| 7,356,591 B2 | 4/2008 | Mousseau et al. |
| 7,395,048 B2 | 7/2008 | Kotzin |
| 7,428,540 B1 | 9/2008 | Coates et al. |
| 7,430,633 B2 | 9/2008 | Church et al. |
| 7,472,247 B2 | 12/2008 | Vitanov et al. |
| 7,483,871 B2 | 1/2009 | Herz |
| 7,512,666 B2 | 3/2009 | Zhou |
| 7,512,847 B2 | 3/2009 | Bychkov et al. |
| 7,523,013 B2 | 4/2009 | Gorobets et al. |
| 7,525,570 B2 | 4/2009 | Kiely |
| 7,549,164 B2 | 6/2009 | Cook et al. |
| 7,568,075 B2 | 7/2009 | Fujibayashi et al. |
| 7,574,580 B2 | 8/2009 | Mahashin et al. |
| 7,650,630 B2 | 1/2010 | Yamada et al. |
| 7,689,805 B2 | 3/2010 | Moore et al. |
| 7,783,956 B2 | 8/2010 | Ko et al. |
| 7,975,305 B2 | 7/2011 | Rubin et al. |
| 8,001,217 B1 | 8/2011 | Pan et al. |
| 8,037,527 B2 | 10/2011 | Milener et al. |
| 2001/0000083 A1 | 3/2001 | Crow et al. |
| 2002/0165825 A1 | 11/2002 | Matsushima et al. |
| 2002/0194382 A1 | 12/2002 | Kausik et al. |
| 2003/0009538 A1 | 1/2003 | Shah et al. |
| 2003/0023745 A1 | 1/2003 | Noe |
| 2003/0033308 A1 | 2/2003 | Patel et al. |
| 2003/0114138 A1 | 6/2003 | Ramaswamy et al. |
| 2003/0115420 A1* | 6/2003 | Tsirigotis et al. ............ 711/133 |
| 2003/0166399 A1* | 9/2003 | Tokkonen et al. ............ 455/419 |
| 2003/0172236 A1 | 9/2003 | Iyengar et al. |
| 2003/0187960 A1 | 10/2003 | Koba et al. |
| 2003/0189589 A1 | 10/2003 | LeBlanc et al. |
| 2003/0236961 A1 | 12/2003 | Qiu et al. |
| 2004/0049579 A1 | 3/2004 | Ims et al. |
| 2004/0117586 A1 | 6/2004 | Estakhri et al. |
| 2004/0122873 A1 | 6/2004 | Wright |
| 2004/0127235 A1 | 7/2004 | Kotzin |
| 2004/0221018 A1 | 11/2004 | Ji |
| 2004/0221118 A1 | 11/2004 | Slater et al. |
| 2004/0221130 A1 | 11/2004 | Lai et al. |
| 2004/0260880 A1 | 12/2004 | Shannon et al. |
| 2005/0039177 A1 | 2/2005 | Burke |
| 2005/0076063 A1 | 4/2005 | Andoh |
| 2005/0097278 A1 | 5/2005 | Hsu et al. |
| 2005/0102291 A1 | 5/2005 | Czuchry et al. |
| 2005/0132286 A1 | 6/2005 | Rohrabaugh et al. |
| 2005/0246543 A1 | 11/2005 | Ezaki et al. |
| 2005/0273514 A1 | 12/2005 | Milkey et al. |
| 2006/0008256 A1 | 1/2006 | Khedouri et al. |
| 2006/0010154 A1 | 1/2006 | Prahlad et al. |
| 2006/0020745 A1 | 1/2006 | Conley et al. |
| 2006/0021032 A1 | 1/2006 | Challener et al. |
| 2006/0059326 A1 | 3/2006 | Aasheim et al. |
| 2006/0064555 A1 | 3/2006 | Prahlad et al. |
| 2006/0075068 A1 | 4/2006 | Kasriel et al. |
| 2006/0075424 A1 | 4/2006 | Talstra et al. |
| 2006/0080664 A1 | 4/2006 | Jawahar et al. |
| 2006/0107062 A1 | 5/2006 | Fauthoux |
| 2006/0136446 A1 | 6/2006 | Hughes et al. |
| 2006/0161604 A1 | 7/2006 | Lobo |
| 2006/0161960 A1 | 7/2006 | Benoit |
| 2006/0168123 A1 | 7/2006 | Krstulich |
| 2006/0168129 A1 | 7/2006 | Van Geest et al. |
| 2006/0168403 A1* | 7/2006 | Kolovson ................... 711/142 |
| 2006/0200503 A1 | 9/2006 | Dosa et al. |
| 2006/0218304 A1 | 9/2006 | Mukherjee et al. |
| 2006/0218347 A1 | 9/2006 | Oshima |
| 2006/0256012 A1 | 11/2006 | Fok et al. |
| 2006/0259715 A1 | 11/2006 | Getzin et al. |
| 2006/0282886 A1 | 12/2006 | Gaug |
| 2006/0294223 A1 | 12/2006 | Glasgow et al. |
| 2007/0005928 A1 | 1/2007 | Trika et al. |
| 2007/0033335 A1 | 2/2007 | Maeda et al. |
| 2007/0088659 A1 | 4/2007 | Phillips |
| 2007/0100893 A1 | 5/2007 | Sanders |
| 2007/0112862 A1 | 5/2007 | Iwatsu et al. |
| 2007/0156845 A1 | 7/2007 | Devanneaux et al. |
| 2007/0156998 A1 | 7/2007 | Gorobets |
| 2007/0157217 A1 | 7/2007 | Jacobs et al. |
| 2007/0165933 A1 | 7/2007 | Thomas et al. |
| 2007/0179854 A1 | 8/2007 | Ziv et al. |
| 2007/0185899 A1 | 8/2007 | Ziv et al. |
| 2007/0198716 A1 | 8/2007 | Knowles et al. |
| 2007/0220220 A1 | 9/2007 | Ziv et al. |
| 2007/0233947 A1 | 10/2007 | Coulson et al. |
| 2007/0276949 A1 | 11/2007 | Mergi et al. |
| 2008/0005459 A1 | 1/2008 | Norman |
| 2008/0005657 A1 | 1/2008 | Sneh |
| 2008/0010372 A1 | 1/2008 | Khedouri et al. |
| 2008/0016174 A1 | 1/2008 | Schiavone et al. |
| 2008/0046449 A1 | 2/2008 | Lee et al. |
| 2008/0068998 A1 | 3/2008 | Jaggi et al. |
| 2008/0077550 A1 | 3/2008 | Shike |
| 2008/0082736 A1 | 4/2008 | Chow et al. |
| 2008/0091878 A1 | 4/2008 | Stern et al. |
| 2008/0098093 A1 | 4/2008 | Simon et al. |
| 2008/0098169 A1 | 4/2008 | Kaluskar et al. |
| 2008/0127355 A1 | 5/2008 | Lorch et al. |
| 2008/0177935 A1 | 7/2008 | Lasser et al. |
| 2008/0189796 A1 | 8/2008 | Linn et al. |
| 2008/0201754 A1 | 8/2008 | Arling |
| 2008/0208961 A1 | 8/2008 | Kim et al. |
| 2008/0222348 A1 | 9/2008 | Mosek |
| 2008/0235520 A1 | 9/2008 | Becker et al. |
| 2008/0243773 A1 | 10/2008 | Patel et al. |
| 2008/0244074 A1 | 10/2008 | Baccas et al. |
| 2008/0244201 A1 | 10/2008 | Heintel et al. |
| 2008/0263113 A1 | 10/2008 | Krishnaiyer et al. |
| 2008/0281883 A1 | 11/2008 | Cannon et al. |
| 2009/0055351 A1 | 2/2009 | Whitehorn et al. |
| 2009/0089366 A1 | 4/2009 | Toth |
| 2009/0132621 A1 | 5/2009 | Jensen et al. |
| 2009/0181655 A1 | 7/2009 | Wallace et al. |
| 2009/0204682 A1 | 8/2009 | Jeyaseelan et al. |
| 2009/0210631 A1 | 8/2009 | Bosworth et al. |
| 2009/0222117 A1 | 9/2009 | Kaplan et al. |
| 2009/0234865 A1 | 9/2009 | Billum et al. |
| 2009/0327712 A1 | 12/2009 | Sarig |
| 2010/0017557 A1 | 1/2010 | Nakanishi et al. |
| 2010/0030963 A1 | 2/2010 | Marcu et al. |
| 2010/0049758 A1 | 2/2010 | Kumar |
| 2010/0115048 A1 | 5/2010 | Scahill |
| 2010/0121712 A1 | 5/2010 | Shahshahani et al. |
| 2010/0146187 A1 | 6/2010 | Grimsrud et al. |
| 2010/0153474 A1 | 6/2010 | Raines et al. |
| 2010/0235329 A1 | 9/2010 | Koren et al. |
| 2010/0235473 A1 | 9/2010 | Koren et al. |
| 2011/0010497 A1 | 1/2011 | Bryant-Rich et al. |
| 2011/0099326 A1 | 4/2011 | Jung et al. |
| 2011/0179143 A1 | 7/2011 | Yairi |

FOREIGN PATENT DOCUMENTS

| | | |
|---|---|---|
| EP | 0 492 106 | 4/2000 |
| EP | 1211861 | 6/2002 |
| EP | 1308853 | 5/2003 |
| EP | 1445703 | 8/2004 |
| EP | 1489510 | 12/2004 |
| EP | 1 923 780 A1 | 5/2008 |
| FR | 2793576 | 5/1999 |
| GB | 2349546 | 11/2000 |
| GB | 2350973 | 12/2000 |
| JP | 2005 169861 | 6/2005 |
| KR | 1020090012308 | 2/2009 |
| WO | WO 00/41510 | 7/2000 |
| WO | WO 02/060154 | 8/2002 |
| WO | WO 02/100117 | 12/2002 |
| WO | WO 03/021441 | 3/2003 |
| WO | WO 03/094474 | 11/2003 |
| WO | WO 2004/068369 | 8/2004 |
| WO | WO 2005/022942 | 3/2005 |
| WO | WO 2005/109302 | 11/2005 |
| WO | WO 2007/044899 | 4/2007 |
| WO | WO 2007/117251 | 10/2007 |
| WO | WO 2007/138584 | 12/2007 |
| WO | WO 2009/088709 A2 | 7/2009 |
| WO | WO 2010/074848 | 7/2010 |
| WO | WO 2010/104814 | 9/2010 |

OTHER PUBLICATIONS

"Cisco MDS 9000 Series Caching Services Module with IBM TotalStorage™ SAN Volume Controller Storage Software for Cisco MDS 9000", Cisco Systems, Inc., http://www.cisco.com/warp/public/cc/pd/ps4159/ps4358/prodlit/md9ds_ds.pdf, printed on Dec. 7, 2010, 9 pages.

"Persistant Caching", IBM® Cognos® 8 Virtual Manager Installation and Configuration Guide, http://publib.boulder.ibm.com/infocenter/c8bi/v8r4m0/index.jsp?topic=/com.ibm.swg.im.cognos.vvm_installation_guide.8.4.0.doc/vvm_installation_guide_id1555PersistentCaching.html, Nov. 27, 2009, 1 page.

Cache Management for the IBM Virtual Taper Server, http://www-03.ibm.com/support/techdocs/atsmastr.nsf/WebIndex/FLASH10054, printed on Jan. 3, 2011, 5 pages.

International Search Report and Written Opinion dated May 7, 2008 for PCT Application Serial No. PCT/IL2008/000126, 12 pages.

International Search Report and Written Opinion dated Oct. 26, 2009 for PCT Application Serial No. PCT/IL2009/000752, 11 pages.

Xiang et al., "Cost-Based Replacement Policy for Multimedia Proxy Across Wireless Internet", IEEE Global Telecommunications Conference, GLOBECOM '01, San Antonio, TX, Nov. 25-29, 2001, pp. 2009-2013.

Yin et al., "A Generalized Target-Driven Cache Replacement Policy for Mobile Environments", Proceedings of the 2003 Symposium on Applications and the Internet (SAINT '03), pp. 1-20.

Ex Parte Quayle Action for U.S. Appl. No. 12/644,885, dated Dec. 7, 2011, 5 pages.

International Report on Patentability issued in International Application No. PCT/IL2009/000752, mailed Feb. 17, 2011, 2 pages.

International Search Report and Written Opinion for PCT/US2011/047270, dated Dec. 20, 2011, 13 pages.

International Search Report for PCT/IB2011/001206, mailed Aug. 30, 2011, 5 pages.

Office Action for U.S. Appl. No. 12/020,553, dated Dec. 19, 2011, 20 pages.

Office Action for U.S. Appl. No. 12/020,553, dated May 12, 2011, 19 pages

Office Action for U.S. Appl. No. 12/185,583, dated Jun. 6, 2011, 13 pages.

Office Action for U.S. Appl. No. 12/185,583, dated Jan. 31, 2012, 17 pages.

Office Action for U.S. Appl. No. 12/336,089, dated Apr. 13, 2011, 14 pages.

Office Action for U.S. Appl. No. 12/336,089, dated Oct. 31, 2011, 14 pages.

Office Action for U.S. Appl. No. 12/645,149, dated Jan. 26, 2012, 9 pages.

Office Action for U.S. Appl. No. 12/645,194, dated Dec. 8, 2011, 26 pages.

Office Action for U.S. Appl. No. 12/720,282, dated Dec. 1, 2011, 14 pages.

Office Action for U.S. Appl. No. 12/720,006, dated Nov. 14, 2011, 11 pages.

Restriction Requirement for U.S. Appl. No. 12/494,758, dated Nov. 21, 2011, 6 pages.

Written Opinion for PCT/IB2011/001206, mailed Aug. 30, 2011, 6 pages.

Written Opinion of the International Searching Authority issued in International Application No. PCT/IL2009/000752, mailed Feb. 17, 2011, 4 pages.

Douglis et al., "Position: Short Object Lifetimes Require a Delete-Optimized Storage System", Proceedings of the 11th Workshop on ACM SIGOPS European Workshop, ACM, 2004, pp. 1-6.

Rigoutsos et al., "Chung-Kwei: A Pattern-Discovery-Based System for the Automatic Identification of Unsolicited E-Mail Messages (SPAM)", Proceedings of the First Conference on Email and Anti-Spam (CEAS), Bioinformatics and Pattern Discovery Group, IBM, 2004.

U.S. Appl. No. 61/159,034, filed Mar. 10, 2009, entitled, "Smart Caching", Inventors: Judah Gamliel Hahn and David Koren (24 pages).

Chandra et al., "Automated Storage Reclamation Using Temporal Importance Annotations", 27th International Conference on Distributed Computing Systems (ICDCS'07), IEEE, pp. 1-10, 2007.

Office Action for U.S. Appl. No. 12/336,089, dated Mar. 22, 2012, 8 pages.

Office Action for U.S. Appl. No. 12/796,267, dated Feb. 10, 2012, 22 pages.

Office Action for U.S. Appl. No. 13/172,589, dated Mar. 22, 2012, 9 pages.

Office Action for U.S. Appl. No. 12/720,006, dated May 1, 2012, 11 pages

Notice of Allowance for U.S. Appl. No. 12/644,885, dated Feb. 16, 2012, 9 pages.

Deng et al., "Architectures and Optimization Methods of Flash Memory Based Storage Systems", Journal of Systems Architecture, vol. 57, pp. 214-227, 2011.

Notification Concerning Transmittal of International Preliminary Report on Patentability for International Application No. PCT/US2009/065456, dated Jun. 30, 2011, 9 pages.

Notification Concerning Transmittal of International Preliminary Report on Patentability for International Application No. PCT/US2009/065056, dated Jun. 30, 2011, 27 pages.

Notification Concerning Transmittal of International Preliminary Report on Patentability for International Application No. PCT/US2010/026596, dated Sep. 22, 2011, 10 pages.

Notification of Transmittal of the International Search Report and the Written Opinion of the International Searching Authority, or the Declaration for International Application No. PCT/US2011/047270, dated Dec. 20, 2011, 13 pages.

Reddy, Mike et al., An Adaptive Mechanism for Web Browser Cache Management, date unknown, 6 pages.

U.S. Appl. No. 13/341,783, filed Dec. 30, 2011, entitled, "System and Method for Managing Discardable Objects", 54 pages.

U.S. Appl. No. 13/341,785, filed Dec. 30, 2011, entitled, "System and Method for Managing Discardable Objects", 54 pages.

Office Action for U.S. Appl. No. 12/336,089, dated Jul. 25, 2012, 17 pages.

Office Action for U.S. Appl. No. 12/645,149, dated May 8, 2012, 9 pages.

Office Action for U.S. Appl. No. 12/645,194, dated Aug. 22, 2012, 30 pages.

Office Action for U.S. Appl. No. 12/720,282, dated May 1, 2012, 12 pages.

Office Action for U.S. Appl. No. 12/720,333, dated May 11, 2012, 7 pages.

Office Action for U.S. Appl. No. 12/796,267, dated Jul. 30, 2012, 23 pages.

Office Action for U.S. Appl. No. 12/895,428, dated May 25, 2012, 15 pages.
Office Action for U.S. Appl. No. 13/172,589, dated Jul. 26, 2012, 15 pages.
International Search Report and Written Opinion for PCT/US2011/047047, dated May 8, 2012, 12 pages.
International Search Report for PCT/US2012/020502, dated Jul. 10, 2012, 3 pages.
Written Opinion for PCT/US2012/020502, dated Jul. 10, 2012, 6 pages.
Partial International Search Report and Invitation to Pay Additional Fees for PCT/US2012/020767, dated Aug. 27, 2012, 9 pages.
International Search Report and Written Opinio for PCT Patent Application Serial No. PCT/US2010/026596, dated Jul. 29, 2010, 15 pages.
International Search Report and Written Opinion for PCT Patent Application Serial No. PCT/US2009/065456, dated Apr. 9, 2010, 11 pages.
International Search Report and Written Opinion for PCT Patent Application Serial No. PCT/US2009/065056, dated Jul. 29, 2010, 35 pages.
Jiang, Zhimei et al., "Web Prefetching in a Mobile Environment", IEEE Personal Communications, IEEE Communications Society, US, vol. 5, No. 5, Oct. 1998, pp. 25-34.
O'Hare, Gregory et al., "Addressing Mobile HCI Needs Through Agents", Proceedings of the 4$^{th}$ International Symposium on Human Computer Interaction with Mobile Devices and Services (MobileHCI'02), Pisa, Italy, 2002, pp. 311-314. Spinger Verlag LNCS 2411.
Rekkedal, S., "Caching of Interactive Branching Video in MPEG-4-Thesis for the Candidatus Scientiarum Degree", *University of Oslo Department of Informatics*, Jul. 12, 2004, 140 pages.

\* cited by examiner

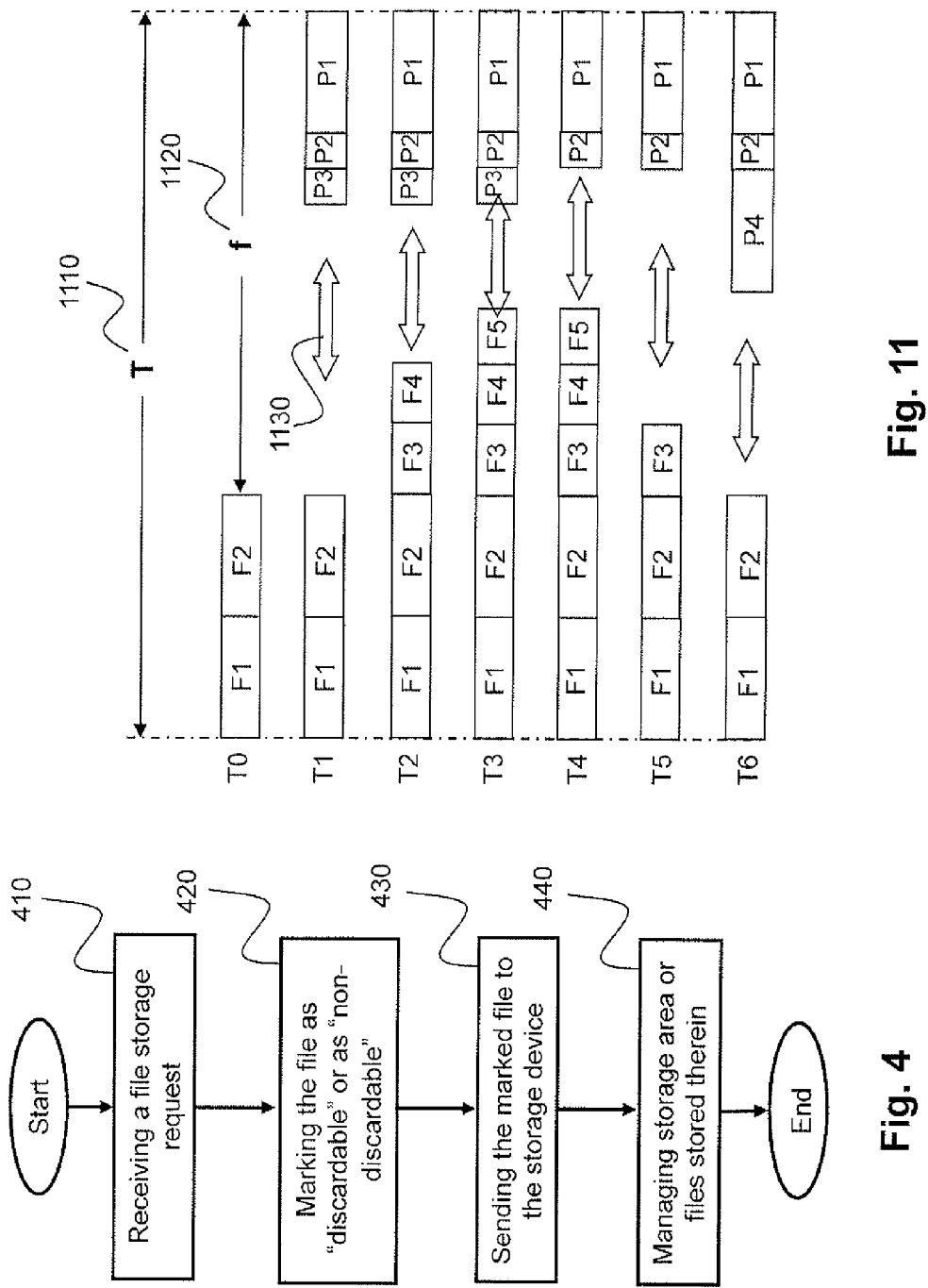

Fig. 7

| DOS Filename | Extension | Attributes | FCN (high) | FCN (low) | File Size |
|---|---|---|---|---|---|
| "REALFILE" | "DAT" | "00" | 0000 | 0002 | 0000 24E4 |
| "\xE5CONSIGN" | "000" | "00" | 0000 | 0005 | 0000 8880 |
| "\xE5CONSIGN" | "001" | "00" | 0000 | 000E | 0000 1400 |

Fig. 8

| F8FF FFFF (cluster #0) | 0000 0000 (cluster #1) | 0000 0003 (cluster #2) | 0000 0004 (cluster #3) | 0FFF FFFF (cluster #4) | 1000 0006 (cluster #5) |
|---|---|---|---|---|---|
| 1000 0007 (cluster #6) | 1000 0008 (cluster #7) | 1000 0009 (cluster #8) | 1000 000A (cluster #9) | 1000 000B (cluster #10) | 1000 000C (cluster #11) |
| 1FFF FFFF (cluster #12) | F000 000F (cluster #13) | 0000 0000 (cluster #14) | FFFF FFFF (cluster #15) | 0000 0000 (cluster #16) | 0000 0000 (cluster #17) |
| 0000 0000 (cluster #18) | 0000 0000 (cluster #19) | 0000 0000 (cluster #20) | 0000 0000 (cluster #21) | 0000 0000 (cluster #22) | 0000 0000 (cluster #23) |

SYSTEMS AND METHODS FOR MANAGING AN UPLOAD OF FILES IN A SHARED CACHE STORAGE SYSTEM

CROSS-REFERENCE TO RELATED APPLICATION

This application claims the benefit of U.S. Provisional Application No. 61/401,841, filed Aug. 19, 2010, the entirety of which is hereby incorporated herein by reference.

FIELD OF THE INVENTION

The present invention generally relates to storage devices and more specifically to methods and to devices for managing the upload to an external location of files that are pre-staged in a cache of a storage device.

BACKGROUND

Publishers (e.g., service and content providers) desire to download unsolicited content to user's storage devices in the hope that users will eventually consume the unsolicited content for a fee, thus increasing their income. The practice of publishers storing unsolicited contents on storage devices without asking users' consent, hoping that the users will consume these contents for a fee, is a concept known in the media publishing field as "predictive consignment". However, unsolicited content may remain stored in a storage device without the user of the storage device knowing of its existence or wanting to consume it. Storing unsolicited content in a storage device reduces the available (i.e., free) user storage space on the storage device, which is undesirable from the user's point of view. A user may find that there is less space in the storage device for the user's own content (e.g., a music file) because someone else (i.e., some publisher) has taken over part of the storage space on the storage device, or that the user may have to reclaim the storage space so taken by deleting the unsolicited content.

Mobile handset users tend to store content they generate or obtain. Users often store content they intend to share with others or to store for future use in a remote repository such as a personal site on a server where they maintain an account. To this end, users will try to upload the content they store in the storage device. However, the storage device may be occupied with all the content that publishers store in it. Indeed, users are not always aware in advance of their storage space limitations, nor are they aware of the network traffic load when they attempt to upload their content to a remote, external site, until they encounter a problem.

Thus, a need developed for a new technology that intelligently manages handset storage, such that a user is free to use their storage space without penalty when the user desires to perform actions such as uploading a file to an external location or pre-staging a file for upload to an external location, while still enabling content owners to push content to handsets.

OVERVIEW

Embodiments of the present invention are defined by the claims, and this section should not be taken as a limitation on those claims. As a brief introduction, embodiments described in this document and illustrated in the attached drawings generally relate to managing files in a store device including a cache storing one or more discardable files. An upload manager, which in some implementations may be part of a storage allocator present in a host to which the storage device is operatively coupled, identifies a file to be uploaded to an external location and determines whether sufficient free space exists in the cache to pre-stage the file for upload to an external location. The upload manager may store the file in the cache upon determining that sufficient free space exists in the cache to pre-stage the file for upload to the external location, where pre-staging prepares a file for opportunistically uploading such file in accordance with an uploading policy. The uploading policy may include uploading a pre-staged file when communication with the external location is off-peak or uploading a pre-staged file to free up space in the cache.

BRIEF DESCRIPTION OF THE DRAWINGS

The accompanying drawings, which are incorporated in and constitute a part of this specification illustrate various embodiments and aspects of the invention and together with the description serve to explain its principles with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures:

FIG. 4 is a method for managing files according to an example embodiment.

FIG. 7 is an exemplary directory area associated with a FAT32 table.

FIG. 8 is a FAT32 table according to an example embodiment.

FIG. 11 demonstrates files' storage management method in accordance with the present disclosure.

DETAILED DESCRIPTION

Figure 1:
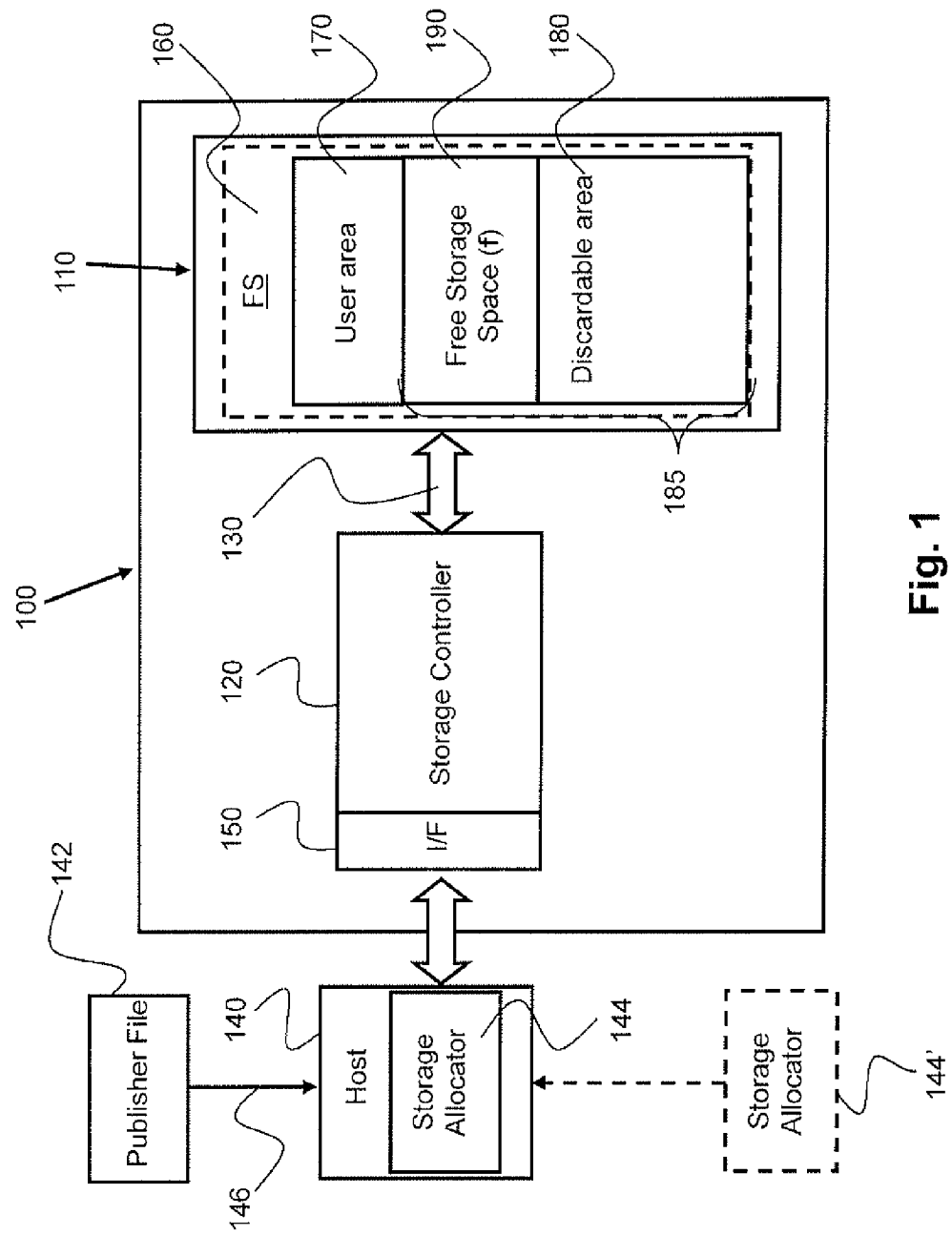
FIG. 1 is a block diagram of a storage system according to an example embodiment.

The following description is provided in the context of this Application for Letters Patent and its requirements to enable a person of ordinary skill in the art to make and use the claimed invention. Various modifications to and equivalents of the embodiments described and shown are possible and various generic principles defined herein may be applied to these and other embodiments. Thus, the claimed invention is to be accorded the widest scope consistent with the principles, features and teachings disclosed herein.

Use of non-volatile storage devices has been rapidly increasing over the years because they are portable and they have small physical size and large storage capacity. Storage devices come in a variety of designs. Some storage devices are regarded as "embedded", meaning that they cannot, and are not intended to be removed by a user from a host device with which they operate. Other storage devices are removable, which means that the user can move them from one host device (e.g., from a digital camera) to another, or replace one storage device with another. For instance, in one installation, a storage device can be removably installed inside the host device (within its housing) much like a buttery is. In another installation, a removable storage device can be externally, removably plugged via a dedicated slot.

The digital content stored in a storage device can originate from a host of the storage device. For example, a digital camera, an exemplary host, captures images and translates them into corresponding digital data. The digital camera then stores the digital data in a storage device with which it operates. Digital content that is stored in a storage device may also originate from a remote source: it can be sent to a host of the storage device, for example, over a data network (e.g., the Internet) or a communication network (e.g., a cellular phone network), and then be downloaded by the host to the storage device. The remote source may be, for example, a service provider or a content provider. Service providers and content providers are collectively referred to hereinafter as "publishers".

As storage devices within mobile handsets grow in size and capabilities, new scenarios for content acquisition and consumption on the go become available. Typically, handsets can be used to consume movies and music downloaded from operator-controlled servers, market applications such as Apple's iTunes service, and side-loaded from sources such as SanDisk's slotMedia cards. However, in all of these applications, the user must proactively seek the content he wishes to consume, indicate and authorize the acquisition of the content, acquire the content, and then consume it. This reduces the ability of content owners to offer content for instant consumption, and the ability of the user to immediately see what he acquires without waiting for it to download.

A number of product initiatives have been created around preloading content to the user, but they all suffer from one common drawback: the user must sacrifice his own storage capacity in order to store content, but cannot access this content until after purchasing it. Users who have to purchase this capacity do not generally want to see a significant portion of it allocated to content that they cannot actually use.

Users of storage devices can willingly download media content and advertisements by requesting the media content or the advertisements from publishers. However, sometimes, publishers, trying to increase their income, send content to users without asking their permission, and sometimes even without the users being aware that such content was downloaded to their storage devices. Content that a publisher sends to users without getting their consent are referred to herein as "unsolicited content". Oftentimes, unsolicited content is intended to be consumed by users after paying, or after committing to pay, the publisher a fee.

As described below, files stored, or files to be stored, in a storage device are marked either as non-discardable or discardable in a structure of a file system associated with the storage device. Each file marked as non-discardable or discardable has associated with it discarding criteria, such as a priority level. Generally, in systems utilizing discardable files, a new publisher's file (i.e., an unsolicited file) is permitted to be stored in the storage device only if storing it in the storage device does not narrow a storage usage safety margin, which is reserved for user files, beyond a desired margin. User files, on the other hand, are allowed to be stored in the storage device even if their storage narrows the storage usage safety margin beyond the desired width. However, in such cases, the desired width of the storage usage safety margin is restored by removing one or more discardable files from the storage device. A discardable file is removed from the storage device if its discarding priority level equals or is higher (or lower, as explained herein) than a predetermined discarding threshold value.

In order to address the pre-staging of files for upload to external locations (such as servers), the storage of unsolicited content, and related issues, user files are given storage priority over other files, and a storage usage safety margin is maintained to guarantee that priority. A "user file" is a file that a user of a storage device has willingly stored, or has approved its storage in the storage device. For example, a music file that the user downloads to her/his storage device is regarded as a user file. User files that are requested or approved for storage by the user are regarded as "solicited" files.

The "other files" may be "pre-staged files" or files known as "publisher files" and "unsolicited files". A "pre-staged file" is a file that is stored in the storage device until the file can be opportunistically uploaded to a remote location based on an uploading policy. Typically, a pre-staged file will not be removed from a storage device until the pre-staged file is uploaded to the remote location. Pre-staged files may be marked as "discardable" in a structure of the storage file system.

A "publisher file" is a file stored by a publisher in a storage device without the user requesting it or being aware of it; at least not for a while. The user may not want to use an unsolicited file such as a publisher file. Unused unsolicited files tend to consume expensive storage space on the user's storage device. Therefore, according to the principles disclosed herein such files are permitted to be stored in the storage device only if storing them does not narrow the storage usage safety margin. Storage priority is rendered to user files by maintaining a free storage space (i.e., a storage usage safety margin) that is reserved for future user's files. The storage usage safety margin has to be maintained in order to ensure that user files can be stored in the storage device whenever required or desired.

If for some reason the storage usage safety margin gets narrower than desired, one or more unsolicited files will be removed (i.e., deleted) from the storage device in order to restore the storage usage safety margin. Maintaining the storage usage safety margin guarantees storage space for additional user files if such files are downloaded to the storage device. To this end, unsolicited files are marked as "discardable" in a structure of the storage file system and, if required, removed later to reclaim at least the free storage space required to maintain the storage usage safety margin.

A storage area of a storage device known as a cache is used for storing files such as pre-staged files or publisher files, or so-called discardable files, and it includes also free storage space of the storage device. Discardable files in the cache can be managed via an alternate data structure or file system in the storage device where they are marked as discardable files.

Because the likelihood of the user using the various user files, pre-staged files, and unsolicited files may differ from one file to another, each file (and more particularly each discardable file) is assigned in advance discarding criteria such as a discarding priority level based on, for example, whether a user of a storage device has willingly stored a file, whether a file is being pre-staged in a cache for opportunistic upload to a remote location, the probability of using the file, the probable revenue associated with using the file, the file's size, the file's type, the file's location, the file's age, etc. For example, with respect to pre-staged files, a discarding priority level may be assigned to a pre-staged file such that the pre-staged file has a greater priority than an unsolicited file but a lower priority than user file. Accordingly, unsolicited files may be removed from the storage device before pre-staged files and pre-staged files may be removed from the storage device before user files.

With respect to unsolicited files, the discarding priority level may be determined by the potential for revenue. This way, movie trailers or advertisements would have a higher discarding priority than the actual movie because users usually don't pay for trailers and advertisements. According to another example, the one or more discardable files that are most likely to be used by the user will be assigned the lowest discarding priority level, which means that such files will be the last file(s) to be removed from the storage device. In other words, the higher the usage probability is of a discardable file the lower the discarding priority level assigned to it will be. If the desired storage usage safety margin is not fully restored even though one or more discardable files were removed, additional discardable files will be removed from the storage device until the desired storage usage safety margin is restored.

Briefly, a data structure such as a file system implements a methodology for storing and organizing various files in a computer system, be it a mobile handset device, a desktop computer, a server, or other computing platform. A file system includes a set of abstract data types and metadata that are implemented for the storage, hierarchical organization, manipulation, navigation, access, and retrieval of data. The abstract data types and metadata form "directory trees" through which the files can be accessed, manipulated and launched. A "directory tree" typically includes a root directory and optional subdirectories. A directory tree is stored in the file system as one or more "directory files". The set of metadata and directory files included in a file system is called herein a "file system structure". A file system, therefore, includes a file system structure that facilitates accessing, manipulating, updating, deleting, and launching the files.

File Allocation Table ("FAT") is an exemplary file system architecture. FAT file system is used with various operating systems including DR-DOS, OpenDOS, MS-DOS, Linux, Windows, Windows Mobile, Windows CE, Symbian OS, Palm OS, uCLinx, TinyOS, NutOS, pSOS, VxWorks, BSD Unix, Nucleus OS, ThreadX (FileX), Android, Mac OS, BlackBerry OS, iOS, etc. A FAT-structured file system uses a table that centralizes the information about which storage areas are free or allocated, and where each file is stored on the storage device. To limit the size of the table, storage space is allocated to files in groups of contiguous sectors called "clusters". As storage devices have evolved, the maximum number of clusters has increased and the number of bits that are used to identify a cluster has grown. The version of the FAT format is derived from the number of the table bits: FAT12 uses 12 bits per entry; FAT 16 uses 16 bits, and FAT32 uses 32 bits.

Another file system architecture is known as New Technology File System ("NTFS"). Currently, NTFS is the standard file system of Windows NT, including its later versions Windows 2000, Windows XP, Windows Server 2003, Windows Server 2008, Windows Vista, and Windows 7. FAT32 and NTFS are exemplary file systems with which storage device 100 can be provided.

FIG. 1 shows a typical storage device 100. Storage device 100 includes a storage area 110 for storing various types of files (e.g., music files, video files, etc.), some of which may be user files and others may be pre-staged files or publisher files. Storage device 100 also includes a storage controller 120 that manages storage area 110 via data and control lines 130. Storage controller 120 also communicates with a host device 140 via host interface 150. Host device 140 may be dedicated hardware or general purpose computing platform.

Storage area 110 may be, for example, of a NAND flash variety. Storage controller 120 controls all of the data transfers to/from storage area 110 and data transfers to/from host device 140 by controlling, for example, "read", "write" and "erase" operations, wear leveling, and so on, and by controlling communication with host 140. Storage area 110 may contain, for example, user files and publisher's files, protected data that is allowed to be used only by authorized host devices, and security data that is used only internally, by storage controller 120. In general, hosts (e.g., host 140) cannot directly access storage area 110. That is, if, for example, host 140 asks for, or needs, data from storage device 100, host 140 has to request it from storage controller 120. In order to facilitate easy access to data files that are stored in storage device 100, storage device 100 is provided with a file system 160.

In this example, storage area 110 is functionally divided into three parts: user area 170, discardable file area 180, and free storage space 190. User area 170 is a storage space within storage area 110 where user files are stored. Discardable file area 180 is a storage space within storage area 110 where files such as pre-staged files or publisher files are stored. Free storage space 190 is an empty storage space within storage area 110. Free storage space 190 can be used to hold a user file, a pre-staged file, or a publisher file. Collectively, the discardable file area 180 and the free storage space 190 occupy a portion of the storage area 110 we refer to here as the cache 185. Upon storing a user file in free storage space 190, the storage space holding the user file is subtracted from free storage space 190 and added to user area 170. Likewise, upon storing a pre-staged file or a publisher file in free storage space 190, the storage space holding the pre-staged file or the publisher file is subtracted from free storage space 190 and added to discardable file area 180. If a user file, pre-staged file, or a publisher file is removed (i.e., deleted) from storage area 110, the reclaimed storage space is added (it returns) to free storage space 190.

If the size of free storage space 190 permits it, the user of storage device 100 can download a user file from host 140 to storage area 110. The downloaded user file will be stored in free storage space 190 and, as explained above, the storage space for holding that file will be subtracted from free storage space 190 and added to user area 170. As explained above, user files have priority over other (e.g., publisher) files, and in order to guarantee that priority, a desired storage usage safety margin is set, and, if required, restored, in the way described below.

Host 140 includes a storage allocator 144 to facilitate restoration of free storage space 190. Storage allocator 144 may be hardware, firmware, software or any combination thereof. In general, storage allocator 144 determines whether a file (e.g., file 142) that is communicated to host 140, or is already present on the host 140, is one of a user file, a pre-staged file, or a publisher file, and then marks the file accordingly (i.e., as a non-discardable file or as a discardable file).

If storage allocator 144 determines that a file (e.g., file 142) is non-discardable, for example because the file is a user file, storage allocator 144 sends the file for storage in storage area 110 in a regular way. As explained above, the storage space within storage area 110 that holds the non-discardable file will be added to, or be part of, user area 170. If, however, storage allocator 144 determines that the file is discardable, for example because it is a pre-staged file or a publisher file, storage allocator 144 marks the file as discardable. It will be appreciated that in some implementations, to mark the file as discardable, storage allocator 144 marks the file system structure in the file system 160 to indicate that the file is a discardable file. In other implementations, to mark the file as discardable, storage allocator 144 marks the file itself as a discardable file. To store a publisher file marked as discardable file, if free storage space 190 is larger than the desired storage usage safety margin, storage allocator 144 stores the marked discardable file in free storage space 190. However, as explained above, the storage space within free storage space 190 that holds the discardable file is subtracted from free storage space 190 (i.e., the free storage space is reduced) and added to discardable file area 180.

As explained above, the likelihood that publisher files may be used by the user may vary from one publisher file to another, which makes a publisher file with the least usage likelihood the first candidate for removal form storage area 110. Therefore, in addition to marking a file as non-discardable or discardable storage allocator 144 assigns a discarding priority level to each discardable file prior, concurrently, or after the discardable file is stored in storage area 110.

By marking files as non-discardable or as discardable, assigning a discarding priority level by storage allocator 144, and by using the file system 160 (or an image thereof) of storage device 100, storage allocator 144 "knows" the number of user files, pre-staged files, and publisher files in storage area 110 and the cache 185, and also their sizes and logical locations within storage area 110 and the cache 185. Knowing this information (i.e., the number, sizes and locations of the files), and particularly based on one or more marked files, storage allocator 144 manages storage area 110 and the storage of solicited and unsolicited files in storage area 110. Managing storage area 110, or managing storage of files in storage area 110, may include, for example, restoring a storage usage safety margin by selectively removing one or more files marked as discardable, pre-staging files for opportunistic uploading to a remote location, freeing a storage area by removing all files marked as discardable, and remapping clusters of a file to a lower-performance storage module. Managing storage area 110 or files stored therein may include managing other, additional, or alternative aspects of storage area 110 or files stored therein.

Storage allocator 144 also knows, by the discarding level assigned to each discardable file, the order at which discardable files can or should be discarded (i.e., deleted or removed from storage area 110) in order to restore the free storage space originally reserved for future user files (i.e., to restore the desired storage usage safety margin). Accordingly, if a user wants to store a new user file in storage area 110 but there is not enough free storage space to accommodate that user file (which means that the storage usage safety margin is narrow than desired), storage allocator 144 uses the discarding priority levels assigned to the discardable files to iteratively delete one discardable file after another to reclaim more free storage space (i.e., to extend free storage space 190) until the desired storage usage safety margin is fully restored. As explained above, a fully restored storage usage safety margin guarantees with high probability that an adequate free storage space is reserved for future user files. Discardable files are removed or deleted from storage device 100 only responsive to receiving a request to store a new user files because it is taken into account that the user may want to use a stored discardable file sometime and, therefore, the discardable file is removed from the storage device only if the storage space accommodating that file is required for the new user file.

Storage allocator 144 may be embedded or incorporated into host 140, or it may reside externally to host 140 (shown as dashed box 144') and to storage device 100.

Storage allocator 144 has a representative image of the file system of, or associated with, storage device 100. Storage allocator 144 uses the storage device's file system image to mark files as non-discardable or as discardable, and to assign a discarding level to each discardable file. Again, a file system is one data structure for managing the files, so the image would be of that of the data structure, whatever form it may have. In this example, the file system includes the FAT and in this case the marking is done in an unused portion of a FAT entry associated with the file, by setting one or more unused bits. Because different file systems have different structures, marking files (i.e., as non-discardable or as discardable) and assigning discarding levels is adapted to the used file system structure, as elaborated in and described below in connection with FIGS. 6 through 1.

Figure 2:
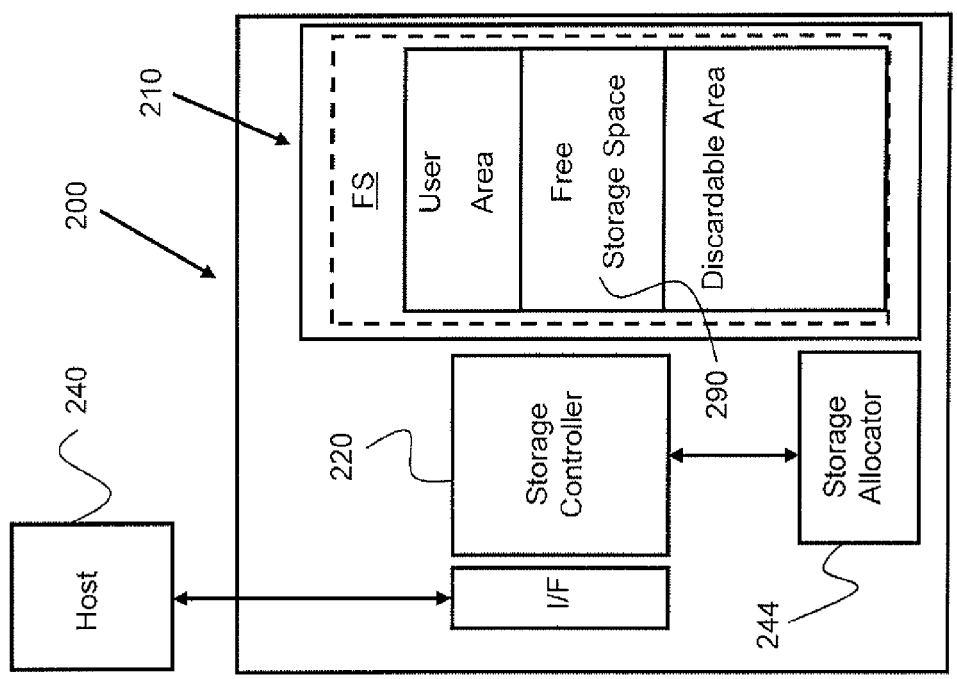
FIG. 2 is a block diagram of a storage system according to another example embodiment.

FIG. 2 is a block diagram of a portable storage device 200 according to another example embodiment. Storage controller 220 functions like storage controller 120 and storage allocator 244 functions like storage allocator 144. Storage allocator 244 may be hardware, firmware, software or any combination thereof. Storage allocator 244 internally cooperates with storage controller 220. Whenever storage controller 220 receives from host 240 a storage request to store a file in storage area 210, the request including an indication of whether or not the file is a discardable file, storage controller 220 informs storage allocator 244 of the storage request and whether or not the file is discardable. The storage allocator 244 then marks the file either as non-discardable or discardable in the structure of the file system associated with storage device 200.

Typically, applications running on the host 240 determine that a file is a discardable file and send a flag or other indication to the storage controller 220 indicating that the file is a discardable file. The applications running on the host 240 send the flag or other indication as part of storage protocols for requesting to store a file on the storage device. Examples of such storage protocols include POSIX file system functions or the usage of the java.io class tree.

If storage allocator 244 determines that the new file is discardable storage allocator 244 assigns to the new file a discarding priority level according to the file's usage probability. Then, storage allocator 244 evaluates the current size of free storage space 290 and decides whether one or more discardable files should be removed (i.e., deleted or uploaded to an external location) from storage area 210 in order to make room for the new file. If discardable file or files should be removed from the storage device storage allocator 244 decides which file(s) are the current candidate files for removal. Then, storage allocator 244 notifies storage controller 220 of the discardable files that should be removed from storage area 210 and, responsive to the notification, storage controller 220 removes the discardable file or files indicated by storage allocator 244. In some configurations of portable storage device 200, the storage allocator 244 may be functionally disposed between storage controller 220 and storage area 210. In configurations where storage allocator 244 is functionally disposed between storage controller 220 and storage area 210, storage allocator 244 or storage area 210 have to assume some of the functions of storage controller 220. In such configurations storage area 210 is comprised of memory units that communicate at a higher level than flash NAND protocols.

Figure 3:
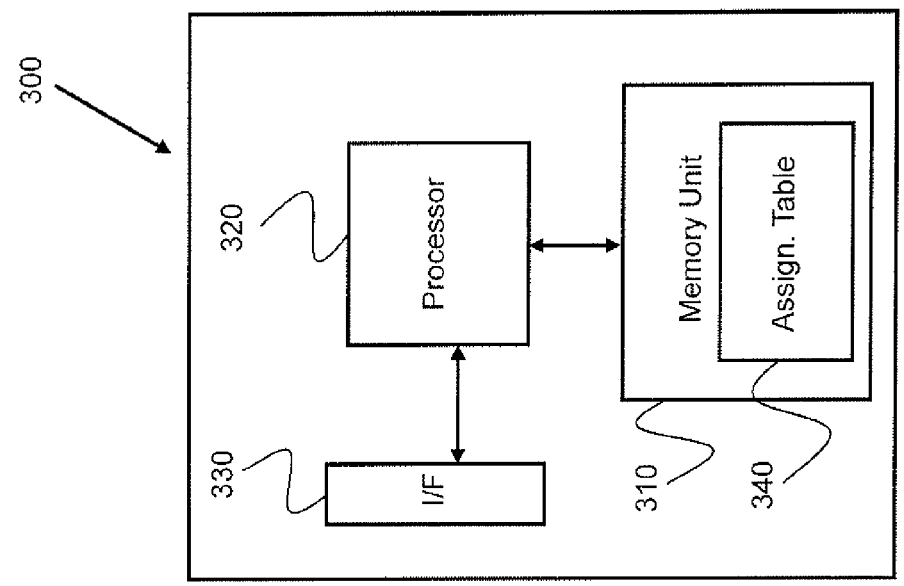
FIG. 3 is a block diagram of a storage allocator according to an example embodiment.

FIG. 3 is a block diagram of a storage allocator 300 according to an example embodiment. Storage allocator 300 includes a memory unit 310, a processor 320, and an interface 330. Memory unit 310 may hold a file system structure, or an image of the file system structure, that is associated with a storage device (e.g., storage device 200 of FIG. 2). Processor 320 manages the file system associated with the storage device. Interface 330 may be adapted to cooperate with a host and with a storage controller of a storage device, as demonstrated in FIG. 1, or only with a storage controller of a storage device, as demonstrated in FIG. 2.

Processor 320 is configured or adapted to receive a request via interface 330 to store a file in a storage area of the storage device, and to mark the file either as discardable or as non-discardable in a structure of the file system associated with the storage device with which storage allocator 300 operates. If interface 330 is functionally attached to storage controller 220 of FIG. 2 (and thus receives, for example, SCSI or wrapped USB/MSC commands rather than file level commands), the received request is at a level that is much lower than a file level. That is, the received request would be a request to store sectors at logical block addresses that, when properly interpreted by a host, would correspond to a file. If storage controller 220 supports the NVMHCI protocol, or a networking file system protocol such as NFS or a similar protocol, storage controller 220 can get file level requests. Therefore, the communication between a storage controller such as storage controller 220 and an interface such as interface 330 is not limited to NVMHCI or to NVMHCI-like implementations. Communication interface 330 may be an integral of storage allocator 300, as shown in FIG. 3.

Processor 320 is further configured or adapted to send the marked file to the storage device. Marking the file as discardable includes assigning to the file a discarding priority level. If the file system used by the storage device is FAT-based, processor 320 assigns the discarding priority level to the marked file by setting a corresponding value to m uppermost (i.e., most significant) bits (e.g., m=4) in a FAT corresponding to the marked file. The corresponding value set to the most significant bits in the FAT entry, or the value set to the NTFS directory entry, may be, or it may be, related to an attribute of the file. By "attribute" is meant a metadata tag or some data structure in the header of the FAT table or NTFS table that contains information that pertains to the type of the content stored within the table. "Advertisement", "premium content", and "promotional (free) content" are exemplary types of contents that may be stored in the FAT table or in the NTFS table. Alternative criteria for setting discarding levels are, for example, the last accessed files, file sizes, file types, etc.

The number m of the uppermost bits of FAT32 entries dedicated for marking files may be four or less than four because those bits are not used. In addition, the more bits are used the more discarding priority levels can be used. For example, using three bits (i.e., m=3) provides eight ($2^3$=8) discarding priority levels and using four bits (i.e., m=4) provides sixteen ($2^4$=16) discarding priority levels (i.e., including discarding priority level "0", which is assigned to non-discardable files). In other words, processor 320 sets the value of the m uppermost bits to 0 if the marked file is non-discardable or to a value between 1 and $2^m-1$ if the marked file is discardable. The discarding priority level indicates the priority at which the marked file can or should be discarded from the storage device. For example, depending on the implementation, the value "1" may denote a file that is either discardable with the lowest priority or with the highest priority, and the value "$2^m-1$" may respectively denote a file that is either discardable with the highest priority or with the lowest priority.

Processor 320 may assign the discarding priority levels to marked files according to an anticipated usage of the files, as explained above in connection with the likelihood or probability that an unsolicited file is going to be used by the user of the storage device. Processor 320 may update the discarding priority level of the marked file with, or responsive to receiving, each request to store a new file in the storage device. Processor 320 may update the discarding priority level of a given marked file independently from one or more new requests to store a file in the storage device. For example, a file that was previously of a high priority may have its priority lowered after a certain time interval. Processor 320 deletes a file that is stored in the storage device if the file has associated with it a discarding priority level that equals or is greater than a predetermined discarding threshold value. Processor 320 may (re)set the discarding threshold value based on the number of file writes or additions, or depending on the anticipated use of free storage space on the storage device or availability of new publisher files.

Memory unit 310 may hold an assignment table 340 that contains discarding priority levels that processor 320 assigns to files stored in the storage device. In addition, assignment table 340 may hold files' identifiers and information that associates files with the discarding priority levels assigned to the files. Assignment table 340 may additionally hold a discarding threshold value. The information held in assignment table 340 allows processor 320 to identify which discardable file or files can be removed from the storage device in order to restore the desired storage usage safety margin.

Responsive to receiving a request to store a new file in the storage device processor 320 evaluates the size of a free storage space (f) on the storage device and stores the new file in the storage device if the evaluated size of the free storage space on the storage device is larger than a predetermined size or, if it is not larger than the predetermined size, processor 320 searches for one or more discardable files within the storage device that can be removed and, upon finding such file or files, processor 320 removes that file or files to extend the current free storage space (f) such that the total size of the extended free storage space equals or is larger than the predetermined size. The discardable file or files can be removed from the storage device if the discarding priority level associated with the discardable files equals or is greater than a predetermined discarding threshold value (for example between 1 and 15 inclusive, for example 15).

After the free storage space is extended enough processor 320 permits the new file to be stored in the extended free storage space. By "free storage space is extended enough" is meant expanding the free storage space by freeing one occupied storage space after another until the total free storage space can accommodate the new file without narrowing the desired storage usage safety margin mentioned above or, equivalently, until the total size of the extended free storage space equals or is greater than a predetermined size or until all discardable files are removed.

Processor 320 can be a standard off-the-shelf System-on-Chip ("SoC") device or a System-in-Package ("SiP") device or general purpose processing unit with specialized software that, when executed, performs the steps, operations and evaluations described herein. Alternatively, processor 320 can be an Application-Specific Integrated Circuit ("ASIC") that implements the steps, operations and evaluations described herein by using hardware.

FIG. 4 is a method for storing discardable files according to one example embodiment. FIG. 4 will be described in association with FIG. 1. At step 410 host 140 receives a request to store file 142 in storage device 100. At step 420 storage allocator 144 marks the file as "discardable" or as "non-discardable" and sends, at step 430, the marked file to storage controller 120 of storage device 100 (i.e., for storage in storage area 110) if free storage space 190 is sufficiently large. A file is marked also in the sense that a discarding priority level is assigned to the file. At step 440 storage allocator 144 manages storage area 110 (through communication with storage controller 120) or files that are stored in storage area 110 based on the marked file and, optionally, based on one or more files that have already been marked.

Figures 5, 6:
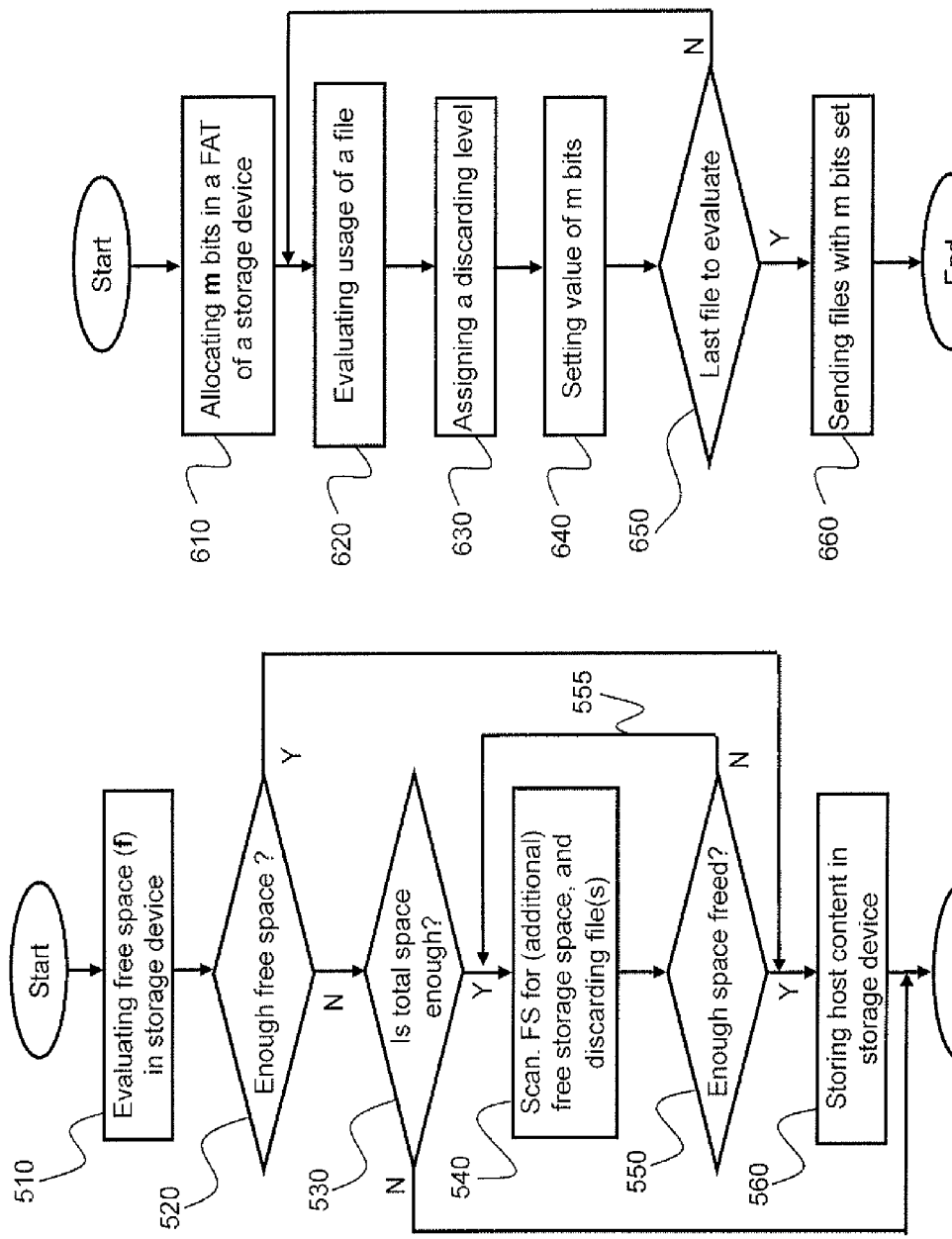
FIG. 5 is a method for managing the storage of discardable files in a storage device according to an example embodiment.
FIG. 6 is a method for marking one or more discardable files in a FAT32-structured file system according to an example embodiment.

FIG. 5 is a method for managing the storage of discardable files in a storage device according to one example embodiment. FIG. 5 will be described in association with FIG. 1. A new file is candidate for storage in storage device 100. Knowing the current image of file system 160 of storage device 100, storage allocator 144 evaluates, at step 510, the current size "f" of free storage space 190 to see whether free storage space 190, whose current size is f, can accommodate the new file (i.e., the file that is candidate for storage). In general, the way storage allocator 144 handles the new file depends on whether the new file is a user file or a publisher file. Therefore, storage allocator 144 determines first whether the new file is a user file or a publisher file.

At step 520 storage allocator 144 checks whether free storage space 190 can accommodate the new user file. If free storage space 190 can accommodate the new user file (shown as "Y" at step 520), storage allocator 144 stores, at step 560, the new user file in free storage space 190 regardless of whether the desired storage usage safety margin is narrowed by storing the new user file or not. If the desired storage usage safety margin gets narrower (i.e., relative to the desired storage usage safety margin) after storage allocator 144 stores the new user file in free storage space 190, storage allocator 144 takes no further actions with respect to the storage of the new user file.

If, however, the desired storage usage safety margin gets narrower after storage allocator 144 stores the new user file in free storage space 190, step 550 includes an additional step where storage allocator 144 determines which stored discardable file should be removed first, which discardable file should be removed second, and so on, in order to maintain the desired storage usage safety margin. Storage allocator 144 determines which discardable file should be removed first, which should be removed second, etc. based on discarding levels that storage allocator 144 assigned to the stored discardable files.

If storage allocator 144 determines at step 520 that free storage space 190 cannot accommodate the new user file (shown as "N" at step 520), storage allocator 144 determines, at step 530, whether free storage space 190 and the storage space consumed by discardable files, when combined, is sufficient for storing the new user file. If the combined storage space is insufficient (shown as "N" at step 530), this means that no matter how many discardable will be removed the new user file cannot be stored in the "non-user" storage area due to its larger size. If the combined storage space is sufficient (shown as "Y" at step 530), storage allocator 144 searches, at step 540, among stored discardable files which discardable file can be deleted in order to free sufficient storage space for the new user file. Storage allocator 144 searches for these discardable files by using the file system of storage device 100 because, as explained above, storage allocator 144 marks files as non-discardable or as discardable in the file system of the storage device. In addition, the discarding levels assigned by storage allocator 144 to marked files are also embedded into the storage device's file system such that each discarding level is associated with the corresponding marked file.

Upon finding a discardable file ("DF") that should be discarded first (that file is called hereinafter "DF1"), storage allocator 144 deletes file DF1 in order to add, or to return, its storage space (that storage space is called hereinafter "SP1") to storage space 190.

Then, at step 550 storage allocator 144 checks whether the extended free storage space 190 (i.e., free storage space 190 plus the last returned storage space, or f+SP1) can accommodate the new user file. If the extended free storage space 190 (i.e., f+SP1) still cannot accommodate the new user file (shown as "N" at step 550) storage allocator 144 iteratively repeats step 550 (the iterations are shown at 555) in order to return an additional storage space to free storage space 190 (i.e., by finding and deleting the next discardable file that should be deleted).

Upon finding the next discardable file with the second highest discarding priority (the next discardable file is called hereinafter "DF2"), storage allocator 144 removes file DF2 in order to free and add additional storage space (the additional storage space is called hereinafter "SP2") to free storage space 190. Then, at step 550 storage allocator 144 checks again whether the extended free storage space 190 (i.e., free storage space 190 plus the two last freed storage spaces, or f+SP1+SP2) can accommodate the new file. If the extended free storage space 190 (i.e., f+SP1+SP2) still cannot accommodate the new file (shown as "N" at step 540), storage allocator 144 repeats step 540 one more time in order to find the next discardable file that should be removed. Storage allocator 144 iterates steps 540 and 550 until the accumulated free storage space 190 can accommodate the new user file (shown as "Y" at step 550). Then, at step 560 storage allocator 144 stores the new user file in storage area 110.

As said above, if the actual storage usage safety margin gets narrower than the desired storage usage safety margin after storage allocator 144 stores the new user file in free storage space 190, step 560 may include an additional step in which storage allocator 144 determines which stored discardable file should be removed first, which discardable file should be removed second, etc., in order to restore the desired storage usage safety margin.

If the new file is a publisher file, storage allocator 144 stores (at step 560) the new publisher file in storage area 110 only if free storage space 190 can accommodate the new publisher file without narrowing the desired storage usage safety margin. That is, if storing the new publisher file would result in narrowing the desired storage usage safety margin storage allocator 144 may decide not to store the new publisher file in storage area 110. In such a case, storage allocator 144 may refrain from taking any action with respect to that file, and remove no file from the storage device to free storage space for the new publisher file. Alternatively, storage allocator 144 may delete at step 540 one or more higher priority discardable files in order to free storage space for a discardable file that has a lower discarding priority. As stated above, files are marked in, and discarding levels are embedded into, the file system of storage device 100, and the way the files are marked and the discarding levels embedded into the file system depends on, or can be adapted to, the used file system.

FIG. 6 is a method for marking a discardable file such as a pre-staged file or an unsolicited file in a FAT32-structured file system according to one example embodiment. FAT32-structured file systems use clusters. As described above in connection with FAT32-structured file systems, the number of bits that are used to identify a FAT32 cluster is 32. FIG. 6 will be described in association with FIG. 1.

At step 610 m uppermost bits of the 32 bits (where m≤4) of each cluster of the FAT32 are allocated or dedicated for marking files as non-discardable or as discardable, as the case may be, and also for holding a corresponding discarding level for each discardable file. Assigning the discarding level to a file is done by setting a corresponding value to the allocated m bits corresponding to the marked file.

At step 620 storage allocator 144 evaluates the level of likelihood at which the user of storage device 100 will use the discardable file, such as an unsolicited file. Evaluation of the likelihood of using the file can be implemented in various ways that are known to those skilled in the art of consignment files. For example, the evaluation of the likelihood of using the file may be based on monitoring the location of the person using the storage device, and/or on monitored user's previous experience and preferences. Evaluation of the likelihood of using the file may also be based, for example, on the type of content stored within the FAT table or NTFS table (e.g., "advertisement content", "premium content", "promotional (free) content", etc.). Storage allocator 144 may use alternative or additional criteria to evaluate the likelihood at which the file will be used. For example it may use attributes or characteristics of file(s), which may be, or be associated with, the last accessed file(s), file sizes, file types, etc.

After storage allocator 144 evaluates the level of likelihood at which the user will use the discardable file storage allocator 144 assigns, at step 630, a discarding priority level corresponding to the evaluated likelihood level of usage of the discardable file. The more likely the discardable file is going to be used by the user of storage device 100 the lower is the discarding level.

If m equals four bits, this means that the discarding scale provides 15 discarding levels from 1 (i.e., 0001) to 15 (i.e., 1111). That is, discarding level 0 will be assigned to every non-discardable file, discarding level 1 will be assigned to a discardable file with the lowest discarding priority, and discarding level 15 will be assigned to a discardable file with the highest discarding priority. After storage allocator 144 assigns a corresponding discarding level to the discardable file, storage allocator 144 sets, at step 640, a corresponding value between 1 and 15 to the four uppermost bits of the clusters associated with the discardable file. If the discardable file has associated with it two or more clusters, the four uppermost bits in each cluster is set to the same value.

At step 650 it is checked whether the discardable file is the last file that needs to be evaluated. If the discardable file is not the last file that needs to be evaluated (shown as "N" at step 650) another file is evaluated in the way described above. If the discardable file is the last file that needs to be evaluated (shown as "Y" at step 650) the discardable file(s) is (are) sent to storage device with the m bits for each whose value was set at step 640.

FIG. 7 is an exemplary directory table 700 associated with a FAT32 table. Directory table 700 is only a partial table used for illustration and as such, table 700 does not show all the fields of a FAT directory entry. Directory area 700 holds particulars of files that are stored in a related file system, such as the files names, files size, and where in a related storage space each file begins. The particulars of the files are held in the following fields. Field 710 holds the Disk Operating System ("DOS") filenames of the files stored in the related file system, field 720 holds the extension of the files, field 730 holds various attributed of the files, field 740 holds the high 16-bitword of the First Cluster Number ("FCN") of the files, field 750 holds the low part of the First Cluster Number ("FCN") of the files, and field 760 holds the size of the files. Each FCN number indicates the first logical cluster where a file may be found.

The first entry of directory area 700 holds information for an exemplary file called "REALFILE" (shown at 770). REALFILE 770 has a file extension "DAT", its FCN is "0000 0002" (shown at 755), and its size is "0000 24E4". Numbers in table 700 are shown in hexadecimal values. As part of the standard, attribute values "00" (shown at 780) and "20" (not shown in FIG. 7) refer to a "regular" file, whereas attribute value "02" refers to a file that is hidden in the file system. Filename "\xE5Consign" indicates a deleted file, where "\xE5" means that the value of the first byte of the filename is E5 in hex. By way of example, FCN number 0000 0002 (shown at 755) designates the first cluster of file REALFILE.

FIG. 8 is an exemplary partial FAT32 table 800 according to an example embodiment. FAT32 table 800 is shown as a double-word ("DWORD") array, and the values are hexadecimal values. Reference numeral 810 designates the type of device holding FAT32 table 800, where "F8" refers to a hard drive. FAT32 table 800 includes 23 clusters that are designated as cluster #1 (shown at 820), cluster #2 (shown at 825), . . . , and cluster #23 (shown at 830). FIG. 8 will be described in association with FIG. 7. A cluster in FAT32 table 800 may be the first cluster of a file, or it may point to the next linked cluster of the file, or it may be an End-of-File ("EOF") indication.

Referring again to directory area 700, the first FCN of file REALFILE (shown at 770) is "0000 0002" (shown at 755), which points at cluster #2 in table 800 of FIG. 8. As shown in FIG. 8 the value of cluster #2 (i.e., the value "000 0003") points (shown at 840) at cluster #3, which is the next file's cluster. Likewise, the value of cluster #3 (i.e., "0000 0004") points at cluster #4, which is the next file's cluster. Cluster #4 has the value "0FFF FFFF" ("F" is the hexadecimal digit that represents the decimal value "15"), where "FFF FFFF" (shown at 850) denotes the file's EOF indication, and the zero value (shown at 860) denotes discarding level 0. File REALFILE, therefore, has associated with it three clusters (i.e., cluster #2, cluster #3, and cluster #4).

As explained above, a discarding level 0 is assigned to non-discardable files. It is noted that the most significant hexadecimal digit of each cluster of a particular file is set to the same discarding priority level that is assigned to that file. For example, file REALFILE has been assigned a discarding level "0" and, therefore, each of the most significant hexadecimal digits of clusters #2, #3, and #4 has that value (i.e., value "0", the "0" values are underlined). According to another example, the file "E5 Consign" whose FCN is "0000 0005" (as shown in FIG. 7) has been assigned a discarding priority level "1". Therefore, the most significant hexadecimal digit of each of clusters #5 through 12, which pertain to that file, has the value "1" (for example as shown at 870). In other words, according to the present disclosure the most significant hexadecimal digit (or, equivalently, the four uppermost bits of the clusters associated with a particular discardable file are set to the same value corresponding to the discarding priority level assigned to the particular file. As explained above the number m of the uppermost bits used for indicating the discarding priority level may differ from four (i.e., m≤4).

Figure 9:
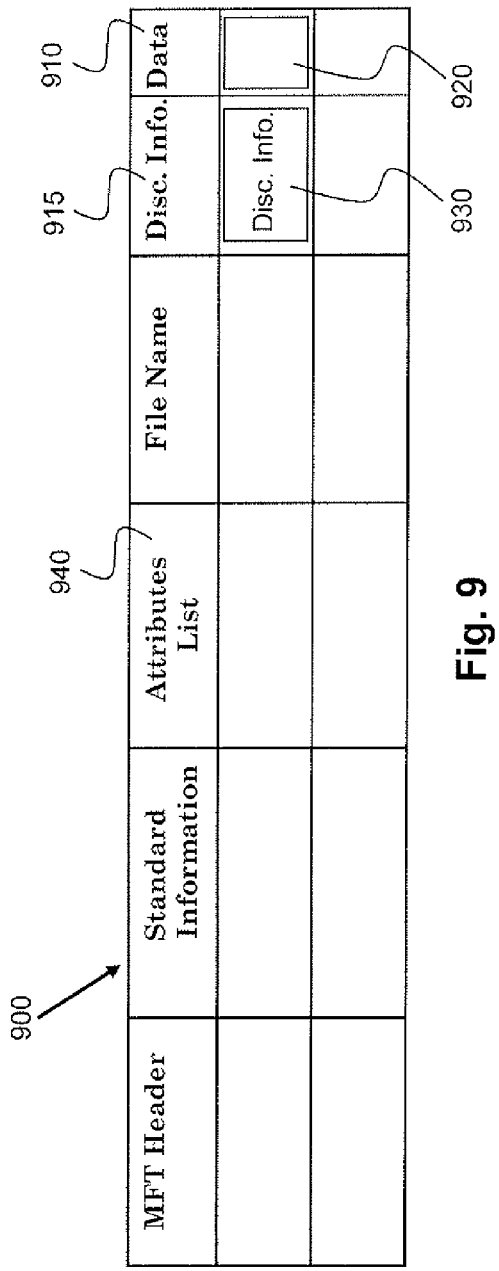
FIG. 9 is an NTFS table according to an example embodiment.

FIG. 9 is an exemplary partial NTFS table 900 according to an example embodiment. NTFS table 900 holds particulars of files such as the file names, the file sizes, etc. NTFS table 900 includes a data field 910 to hold "regular" data (e.g., data 920) for files that change according to "normal" data flow. According to the present disclosure, NTFS table 900 also includes a "Discarding Information" field 915 for holding, discarding information (e.g., discarding information 930) for each evaluated file. Discarding information field 915 may also include information other than the discarding priority level. For example, discarding information field 915 may include information pertaining to the server that supplied the file and an expiration time after which the file must be discarded. Unlike FAT-based file systems, in NTFS-based file systems the discarding values assigned to discardable files are not limited to a maximum number that is dictated by a set of bits. This means that the range of discarding values can be chosen liberally. For example, discarding values can range from 1 to 25. NTFS is an exemplary non-FAT file system. In general, corresponding discarding values may be set to a data field in a non-FAT based file system entries corresponding to marked files.

Figure 10:
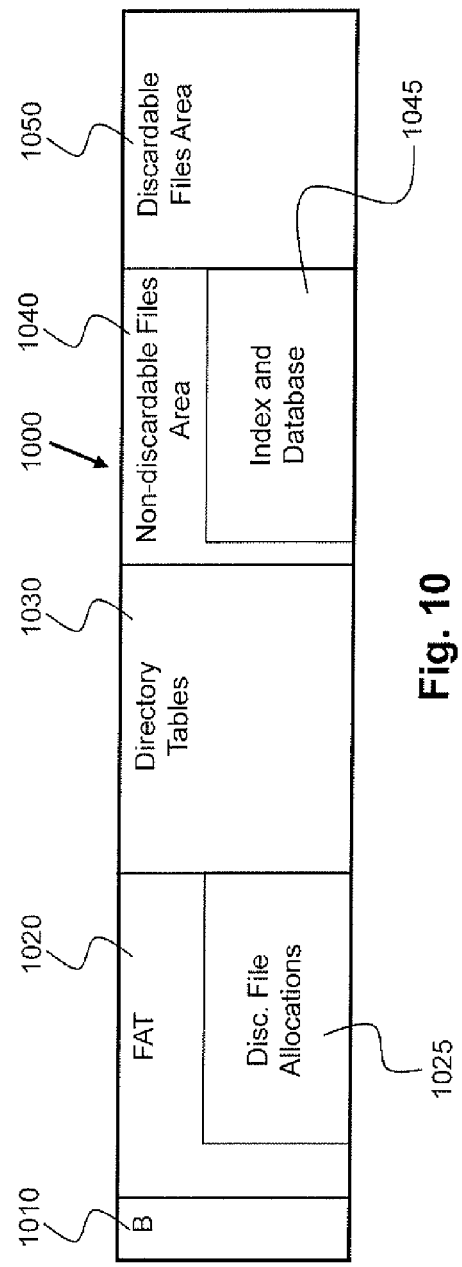
FIG. 10 is a logical image of a FAT-based file system according to example embodiments.

FIG. 10 is a logical arrangement of file system 1000 of a storage device according to an example embodiment. A storage allocator (e.g., storage allocator 144 of FIG. 1) may either hold file system 1000 of the storage device with which it operates or an image of file system 1000, or the storage allocator may have an access to file system 1000.

File system 1000 includes a boot section 1010, a FAT 1020 associated with file system 1000, directory tables 1030, a files area 1040, and a discardable files area 1050. FAT 1020 includes a discardable files allocations area 1025 that contains the discarding priority levels of discardable files. Directory tables 1030 include access information for accessing whatever files (i.e., discardable files and/or non-discardable files) are stored in the storage device. Files area 1040 contains the non-discardable files. Index and database area 1045 holds indexes for the discardable files and also metadata that is related to the discardable files. The indexes and metadata held in Index and database area 1045 are used to calculate the discarding levels but they are not required during the actual discarding process. Discardable files area 1050 holds the discardable files.

FIG. 11 demonstrates the files management method according to the present disclosure. FIG. 11 will be described in association with FIG. 1. It is assumed that at time T0 two user files (i.e., files "F1" and "F2") are initially stored in storage area 110. Because files "F1" and "F2" are user files they are stored in user area 170 and the discarding level assigned to them by storage allocator 144 is zero. Because the total storage capacity of storage area 110 is T (shown at 1110) and files F1 and F2 are stored in storage device 100, the size of the remaining free storage space 190 (see FIG. 1) is f (shown at 1120). It is assumed that a publisher wants to store three unsolicited files in storage area 110. As described above, storage allocator 144 evaluates the size of free storage space 190 (or f at 1120) in storage device 100 in order to determine whether storing the publisher's three unsolicited files in storage area 110 will not narrow a desired storage usage safety margin (shown at 1130) that is reserved for future user's files. If storing publisher's three unsolicited files would narrow storage usage safety margin 1130 (i.e., the desired storage usage safety margin) storage allocator 144 will refrain from storing these files.

In this example, storage allocator 144 determines that the publisher's three unsolicited files can be stored in storage area 110 without reducing storage usage safety margin 1130. Therefore, at time T1 storage allocator 144 permits storage controller 120 to store the publisher's three unsolicited files in storage area 110. The three publisher's unsolicited files are designated as "P1", "P2", and "P3". Storage allocator 144 also determines the probability that files P1, P2, and P3 will be used by the user of storage device 100 and assigns a corresponding discarding level to each of these file. Storage allocator 144 then stores the discarding levels assigned to the files in the FAT table, as demonstrated in FIG. 8, or in the NTFS table, as demonstrated in FIG. 9.

At time T2 the user of storage device 100 wants to store in storage area 110 two more files (i.e., files "F3" and "F4"). Storage allocator 144 reevaluates the size of free storage space 190 (or f at 1120) in storage device 100 in order to determine whether there is sufficient storage space in storage area 110 to store the additional files (i.e., files F3 and F4). In this example storage allocator 144 determines that the currently free storage space can accommodate files F3 and F4. Therefore, at time T2 storage allocator 144 permits storage controller 120 to store files F3 and F4 in storage area 110.

Because files F3 and F4 are user files the probability that files F3 and F4 will be used by the user of storage device 100 is irrelevant because user files have storage priority over publisher files regardless of how many times, if at all, the user is going to use files F3 and F4. Accordingly, storage allocator 144 assigns a discarding level "0" to files F3 and F4 and stores the assigned discarding level in the FAT table, as demonstrated in FIG. 8, or in the NTFS table, as demonstrated in FIG. 9.

At time T3 the user of storage device 100 wants to store in storage area 110 another file (i.e., file "F5"). Storage allocator 144 reevaluates the size of free storage space 190 (or f at 1120) in storage device 100 in order to determine whether there is sufficient storage space in storage area 110 to store the additional file (i.e., file F5).

In this example, storage allocator 144 determines that the currently free storage space can accommodate file F5. Therefore, at time T3 storage allocator 144 permits storage controller 120 to store file F5 in storage area 110. As shown in FIG. 11, storing user file F5 narrows the storage usage safety margin. That is, the free storage space f in storage area 110 that remains after files F1 through F5 and P1 through P3 are stored in storage area 110 is smaller than storage usage safety margin 1130. Therefore, storage allocator 144 reinstates or restores the storage usage safety margin by removing one of the discardable files such as publisher's files (i.e., P1, P2, and P3). A storage usage safety margin is reinstated or restored by removing (i.e., deleting or uploading to an external location) one or more discardable files such as publisher files because, as explained above, user files have ultimate storage priority.

As described above, the decision of which discardable files should be removed from the storage area 110 is made by storage allocator 144 based on the discarding priority level that storage allocator 144 assigned to each stored discardable file.

Turning back to FIG. 11, it is assumed that among the stored publisher files P1 through P3 publisher file P3 was assigned the highest discarding priority level (e.g., 13). Therefore, at time T4 file P3 is removed from storage area 110, thus enlarging the free storage space 190. Because the size of free storage space 190 (or f at 1120) at time T4 is larger than storage usage safety margin 1130, there is no need to remove any more publisher files.

The user of storage device 100 may want to remove one or more user files. At time T5 the user removed two of his files (i.e., files F4 and F5), thus further enlarging free storage space 190. The removal of files F4 and F5 has nothing to do with the size of free storage space 190 or the storage usage safety margin because, as stated herein, regaining free storage space or restoring the storage usage safety margin is done by removing as many discardable files as necessary. It is assumed that a publisher wants to store another unsolicited file in storage area 110. As described above, storage allocator 144 evaluates the size of free storage space 190 (or f at 1120) in order to determine whether storing the publisher's unsolicited file in storage area 110 will not narrow storage usage safety margin 1130. If storing the publisher's the new unsolicited file will narrow storage usage safety margin 1130 storage allocator 144 will refrain from storing that file.

In this example storage allocator 144 determines that the publisher's new unsolicited file (i.e., file "P4") can be stored in storage area 110 without reducing storage usage safety margin 1130. Therefore, at time T6 storage allocator 144 permits storage controller 120 to store the publisher's file P4 in storage area 110. Storage allocator 144 also determines the probability that file P4 will be used by the user of storage device 100 and assigns a corresponding discarding level to this file. Storage allocator 144 then stores the discarding level assigned to file P4 in the FAT table, as demonstrated in FIG. 8, or in the NTFS table, as demonstrated in FIG. 9. The process of storing new publisher's files and new user files and removing stored files may continue while each time a new file is to be added to storage area 110, storage allocator 144 evaluates the current size of free storage space 190 and determines which discardable file or files (if at all) has/have to be removed from storage area 110.

Assigning a discarding level to a discardable file may be based on, for example, whether a file is pre-staged to be opportunistically uploaded to a remote location, user experience or preferences, on Global Positioning System ("GPS") location of the user, and/or on other criteria. For example, if the user of the storage device seems (based on previous user experience) to like certain types of music, the storage allocator may assign a relatively low discarding priority level (e.g., 3 in a scale of 1 to 15) to a publisher's file if that file contains music that is one of the user's favorite types of music. However, if the publisher's music is disliked by the user (i.e., based on previous user experience), the storage allocator may assign to the related publisher's file a higher discarding priority level (e.g., 12 in a scale of 1 to 15). The criteria used to assign a discarding level to a discardable file may include anticipated usage of the file, anticipated revenue associated with using the file, the file's type, the file's size, the file's location in the storage device, the file's age, and other criteria or parameter as specified herein. Other criteria, whether alone or in combination with any of the criteria mentioned herein, may likewise be used, and the assignment of discarding levels may be done using one or more criterions. In addition, different criteria may be used to assign a discarding level to different discardable files.

In another example, if a publisher wants to send to a user a location-dependent advertisement (i.e., an advertisement relating to a product or service rendered within a specific locality), the storage allocator may assign a discarding priority level to the publisher's advertisement that changes according to the user's changing location. That is, the farther the user gets from a particular location, the higher the discarding level would be, because by getting away from the specific locality it can be assumed that the user is not interested in consuming the product or service rendered at the specific locality.

Upload Management

The Smart Caching methods for managing data are utilized in the upload management, as described in more detail below. Smart Cache techniques for managing an upload of a file to an external location and for pre-staging of a file for upload in a system include storing one or more unsolicited files and one or more pre-staged files in the cache. Generally, an upload manager, which in some implementations may be part of the storage allocator described above, determines whether a file may be pre-staged in a cache of a storage device for upload to an external location. As described above, a cache of a storage device may be an area of a storage device storing files of an alternate file system. A file is pre-staged when the file is stored in the cache so that the file may be opportunistically uploaded to an external location. For example, files may be stored in the cache for upload to an external location during an off-peak period or pre-staged files may be uploaded to one or more external locations to free up space in the cache. Examples of off-peak periods may include evening hours, such as after 8:00 p.m., when a network may not be congested, or a day during a weekend. In other implementations, upload managers may dynamically determine off-peak periods based on network congestion information received from a network.

The upload manager may determine whether a file may be pre-staged in the cache based on factors in an uploading policy. The uploading policy may include factors such as whether sufficient free space exists in the cache to pre-stage the file for upload; whether one or more discardable files in the cache with discarding criteria higher than that of the file may be removed from the cache in order to reclaim sufficient space in the cache to pre-stage the file for upload; whether one or more pre-staged files already stored in the cache may be uploaded to external locations to free up sufficient space in the cache to pre-stage the file for upload; and/or whether the file may be immediately uploaded to the external location. The upload manager may also consider factors in determining whether a file may be pre-staged in a cache for upload to an external location such as an amount of bandwidth available to upload a file to an external location; a type of network available to upload a file to an external location; a power condition associated with a host device and/or the storage device; a number of read requests, a number of erases, and/or a number of writes, or any other flash endurance parameter associated with the storage device; a security parameter associated with a storage device; a number of applications accessing a storage area of the storage device at one time; whether an external location is currently accessible; and/or whether a user is authorized to access an external location.

For example, the upload manager may determine to delay an upload of a file to an external resource while an external location is inaccessible for reasons such as a network connection being unavailable for communication with the external location, the external location being unavailable via a network that a host device is currently established with, or the external location being offline. The upload manager may also determine to delay an upload of a file to an external resource when an external resource indicates that a user is not authorized to access the external location, when a user provides incorrect credential information, or when a user must be authorized prior to uploading a file to the external resource. Additionally, the upload manager may determine to delay an upload of any file to an external location until a wireless fidelity (WiFi) network and/or a cellular network is available to upload the file. Similarly, the upload manager may determine to upload a file to an external location while a storage device and/or a host device is coupled with a power supply or a power level of a battery associated with a storage device and/or a host device is above a predetermined level. However, the upload manager may determine to delay an upload of any file to an external location while a battery associated with the storage device and/or the host device is charging and/or while a power level of a battery associated with a storage device and/or a host device is below a predetermined level. Further, the upload manager may determine to delay an upload of a file to an external location that is requested during business hours when network congestion may be high until evening hours, such as after 8:00 p.m., when a network may not be congested; the upload manager may determine to delay an upload of a file to an external location that is requested on a day during a work week until a day during a weekend; or the upload manager may determine to delay an upload of a file to an external location until the upload manager receives an indication that a level of traffic in a network is below a predetermined level.

Figure 12:
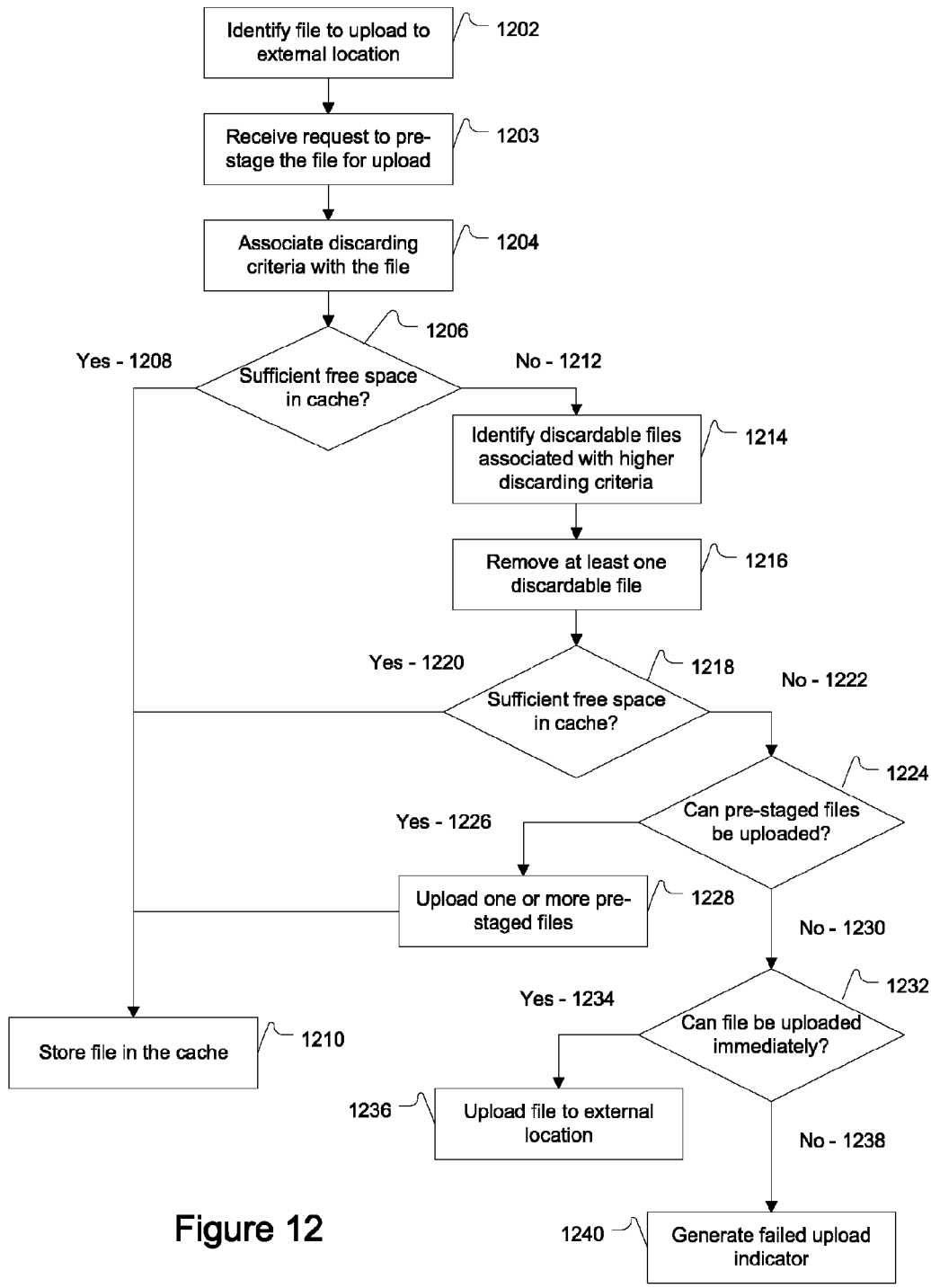
FIG. 12 illustrates a flow chart of a method for managing an upload of a file to an external location in a system including a cache configured to store one or more discardable files.

FIG. 12 is a flow chart of a method for managing an upload of a file in a system that includes a cache storing one or more discardable files, such as one or more unsolicited files and/or one or more pre-staged files. At step 1202, a file is identified for upload to an external location. It will be appreciated that a host device may initially create the identified file when a host device performs operations such as capturing a picture or video, or the host device may create the identified file when the host device performs operations such as downloading the file from an external source, such as a remote server or a website, or copying the file from a storage device. In some implementations, at step 1203, the upload manager, which may be part of the storage allocator, will receive a request to pre-stage the file for upload to an external location. The external location may be, for example, a website such as a social networking website where a user desires to post a video or a picture, or the external resource may be remote servers, a home personal computer, a router-attached storage device, or a peer network where a user desires to send one or more files.

At step 1204, the upload manager associates discarding criteria, such as a priority level, with the file. In some implementations, discarding criteria associated with a pre-staged file may be different than discarding criteria associated with unsolicited files such that pre-staged files are removed from the cache based on one set of criteria and unsolicited files are removed from the cache based on another set criteria. However, in other implementations the discarding criteria associated with a pre-staged file and an unsolicited file are of the same type, such as a discarding priority level. In implementations where a storage allocator removes pre-staged files and unsolicited files from the cache (also known as discarding a file) based on different criteria, a storage allocator may, for example, never remove a pre-staged file from the cache without first uploading the pre-staged file to an external resource, but to remove an unsolicited file from the cache, the storage allocator may simply delete the file. In other words, the cache may include discardable files such as pre-staged files and unsolicited files, where all the discardable files can be removed from the cache (discarded) without notice, but pre-staged files are removed from the cache (discarded) only after they are uploaded to an external resource. The upload manager may associate discarding criteria with the file to be pre-staged that is less than discarding criteria of unsolicited files but higher than discarding criteria of user files such that the file to be pre-staged in the cache has a higher priority than unsolicited files but a lower priority than user files.

At step 1206, the upload manager determines whether sufficient free space exists in a cache to pre-stage the file for upload to the external location. If sufficient free space exists in the cache (branch 1208), the upload manager stores the file in cache to pre-stage the file for upload to the external location at step 1210.

However, if sufficient free space does not exist in the cache to pre-stage the file for upload to the external location (branch 1212), the upload manager identifies, at step 1214, one or more discardable files, such as unsolicited files, that are stored in the cache that are associated with discarding criteria that is higher than the discarding criteria of the file to be pre-staged. It will be appreciated that, as described above, when a discardable file has discarding criteria that is higher than the discarding criteria of the file to be pre-staged, the discardable file may be removed from the cache to create free space in the cache to pre-stage the file for upload to the external location. At step 1216, the upload manager removes at least one of the identified discardable files that is associated with discarding criteria that is higher than the discarding criteria of the file, starting with the discardable file associated with the highest discarding criteria and proceeding with the discardable file associated with the next highest discarding criteria, in sequence. In some implementations, the upload manager removes no more discardable files from the cache than are needed to free up space in the cache for the file to be pre-staged.

At step 1218, the upload manager determines whether, after removing one or more discardable files from the cache, sufficient free space exists in the cache to pre-stage the file for upload to the external location. If the upload manager determines that sufficient free space exists (branch 1220), the upload manager stores the file in the cache to pre-stage the file for upload to the external location at step 1210.

However, if the upload manager determines that sufficient free space does not exist (branch 1222), the upload manager determines, at step 1224, whether one or more pre-staged files already stored in the cache may be uploaded to external locations to create sufficient free space in the cache to pre-stage the file for upload to the external location. In some implementations, the upload manager may determine whether one or more pre-staged files already stored in the cache may be uploaded to external locations based on factors in an uploading policy such as an amount of bandwidth available to upload a file to an external location; a type of network available to upload a file to an external location; a power condition associated with a host device and/or the storage device; a number of read requests, a number of erases, and/or a number of writes, or any other flash endurance parameter associated with the storage device; a security parameter associated with a storage device; a number of applications on the host device accessing the storage area of the storage device at one time; whether an external location is currently accessible; and/or whether a user is authorized to access an external location. In some implementations, the upload manager may query the storage device to determine metrics associated with the storage device such as a power condition associated with the storage device; a number of read requests, a number of erases, and/or a number of writes, or any other flash endurance parameter associated with the storage device; a security parameter associated with the storage device; and/or a number of host applications currently accessing the storage area of the storage device.

If the upload manager determines that one or more pre-staged files already stored in the cache may be uploaded to external locations to create sufficient free space in the cache to pre-stage the file for upload to the external location (branch 1226), the one or more pre-staged files are uploaded to external locations to create sufficient free space in the cache to pre-stage the file for upload to the external location at step 1228. The upload manager then stores the file in the cache to pre-stage the file for upload to the external location at step 1210.

However, if the upload manager determines that one or more pre-staged files already stored in the cache may not be uploaded to external locations to create sufficient free space in the cache to pre-stage the file for upload to the external location (branch 1230), the upload manager determines, at step 1232, whether the file may be immediately uploaded to the external location. In some implementations, the upload manager may determine whether the file may be immediately uploaded to the external location based on factors in an uploading policy such as an amount of bandwidth available to upload a file to an external location; a type of network available to upload a file to an external location; a power condition associated with a host device and/or the storage device; a number of read requests, a number of erases, and/or a number of writes, or any other flash endurance parameter associated with the storage device; a security parameter associated with a storage device; a number of applications accessing the storage area of the storage device at one time; whether an external location is currently accessible; and/or whether a user is authorized to access an external location.

If the upload manger determines that the file may be immediately uploaded to the external location (branch 1234), the file is immediately uploaded to the external location at step 1236. However, if the upload manager determines that the file may not be immediately uploaded to the external location (branch 1238), the upload manger generates, at step 1240, a failed upload indicator.

As described above, in one aspect, a method is provided for managing files in a storage device. The method may be performed by an upload manager, which in some implementations may be part of a storage allocator, which is present in a host to which a storage device is operatively coupled. The storage device includes a cache for storing one or more discardable files.

The upload manager identifies a file to be uploaded to an external location and determines whether sufficient free space exists in the cache to pre-stage the file for upload to an external location. The upload manager may store the file in the cache upon determining that sufficient free space exists in the cache to pre-stage the file for upload to the external location, where pre-staging prepares a file for opportunistically uploading such file in accordance with an uploading policy. The uploading policy may include uploading a pre-staged file when communication with the external location is off-peak or uploading a pre-staged file to free up space in the cache. The discardable files in the cache may include pre-staged files and unsolicited files, where the upload manager may remove all discardable files from the cache (also known as discarding a file) without notice, but the upload manager only removes pre-staged files from the cache after they are uploaded to an external resource.

The upload manager may determine that pre-staging the file for uploading to the external requires more space than free space exists in the cache. The upload manager may associate discarding criteria with the file and determine whether one or more discardable files are stored in the cache that are associated with discarding criteria that is higher than that of the file to be pre-staged. The upload manager may remove one or more discardable files from the cache that are associated with discarding criteria that is higher than that of the file to be pre-staged to free up space in the cache for the file to be pre-staged for uploading, starting with the discardable file associated with the highest discarding criteria and proceeding with the discardable file associated with the next highest discarding criteria, in sequence. The upload manager may remove no more discardable files form the cache than is needed to free up space in the cache for the file to be pre-staged. The upload manager may store the file in the cache upon determining that sufficient free space exists in the cache to pre-stage the file for upload to the external location. The discarding criteria associated with the file may include a priority level.

The upload manager may determine, after removing one or more discardable files from the cache, whether sufficient free space exists in the cache to pre-stage the file for upload to the external location. Upon determining that, after removing one or more discardable files form the cache, sufficient free space exists in the cache to pre-stage the file for upload to the external location, the upload manager stores the file in the cache of the storage device.

However, upon determining that, after one or more discardable files from the cache, sufficient free space does not exist in the cache to pre-stage the file for upload to the external location, the upload manager may determine whether one or more pre-staged files already stored in the cache may be uploaded to external locations to create sufficient free space in the cache to pre-stage the file for upload to the external location. Upon determining that the one or more pre-staged files may be uploaded to external locations to create sufficient free space in the cache to pre-stage the file for upload to the external device, the upload manager may upload the one or more pre-staged files already stored in the cache and store the file in the cache after uploading the one or more pre-staged files to external locations.

The upload manager may determine whether the file can be uploaded immediately to the external locations when pre-staged files are not stored in the cache that may be uploaded to external locations to create sufficient free space in the cache to pre-stage the file for upload to the external location. The upload manager may upload the file to the external location upon determining the file can be uploaded immediately, or alternatively, the upload manager may generate a failed upload indicator upon determining that the file can not be uploaded immediately.

In order to determine whether the one or more pre-staged files already stored in the cache may be uploaded to external location, the upload manager may determine whether the one or more pre-staged files may be uploaded to external locations based on an amount of network bandwidth available to upload the one or more pre-staged files to external locations; determine whether the one or more pre-staged files may be uploaded to external locations based on a power level associated with a host device; determine whether the one or more pre-staged files may be uploaded to external locations based on at least one of a number of read requests, a number of erases, or a number of writes associated with the storage area of the storage device; determine whether the one or more pre-staged files may be uploaded to external locations based on a security parameter associated with the storage device; or determine whether the one or more pre-staged files may be uploaded to external locations based on a number of host applications currently accessing the storage area of the storage device.

In order to determine whether the one or more pre-staged files already stored in the cache may be uploaded to external location, the upload manager may query the storage device for one or more metrics associated with the storage area of the storage device and determine whether the one or more pre-staged files may be uploaded to external locations based on the one or more metrics. The one or more metrics may include at least one of a number of media reads, a number of erases, or a number of writes associated with the storage area of the storage device.

In another aspect, as described above, a storage system is provided. The storage system includes a communication interface and a processor for managing a cache of a storage device, wherein the cache is configured to store one or more discardable files. The processor is configured to identify a file to be uploaded over the communication interface to an external location. The processor is configured to determine whether sufficient free space exists in the cache to pre-stage the file for upload to an external location. The processor may additionally be configured to store the file in the cache upon a determination that sufficient free space exists in the cache to pre-stage the file for upload to the external location, wherein pre-staging prepares a file for opportunistically uploading such file in accordance with an uploading policy. The uploading policy may include uploading a pre-staged file when communication with the external location is off-peak or uploading a pre-staged file to free up space in the cache. The discardable files in the cache may include pre-staged files and unsolicited files, and the processor may be configured to remove all discardable files from the cache (also known as discarding a file) without notice. However, the processor may be configured to only remove pre-staged files from the cache after they are uploaded to an external resource.

The processor may be configured to determine that pre-staging the file for uploading to the external requires more space than free space exists in the cache. The processor may additionally be configured to associate discarding criteria with the file and to determine whether one or more discardable files are stored in the cache that are associated with discarding criteria that is higher than that of the file to be pre-staged. The processor may be configured to remove one or more discardable files from the cache that are associated with discarding criteria that is higher than that of the file to be pre-staged to free up space in the cache for the file to be pre-staged for uploading, starting with the discardable file associated with the highest discarding criteria and proceeding with the discardable file associated with the next highest discarding criteria, in sequence. The processor may be configured to remove no more discardable files form the cache than is needed to free up space in the cache for the file to be pre-staged. The processor may be configured to store the file in the cache upon determining that sufficient free space exists in the cache to pre-stage the file for upload to the external location. The discarding criteria associated with the file may include a priority level.

The processor may further be configured to determine, after removing one or more discardable files from the cache, whether sufficient free space exists in the cache to pre-stage the file for upload to the external location. Upon a determination that, after removing one or more discardable files from the cache, sufficient free space exists in the cache to pre-stage the file for upload to the external location, the processor may be configured to store the file in the cache.

However, upon a determination that, after removing one or more discardable files from the cache, sufficient free space does not exist in the cache to pre-stage the file for upload to the external location, the processor may be configured to determine whether one or more pre-staged files already stored in the cache may be uploaded to external locations to create sufficient free space in the cache to pre-stage the file for upload to the external location. Upon determining that the one or more pre-staged files may be uploaded to external locations to create sufficient free space in the cache to pre-stage the file for upload to the external device, the processor may be configured to upload the one or more pre-staged files already stored in the cache and to store the file in the cache after uploading the one or more pre-staged files to external locations.

The processor may be configured to determine whether the file can be uploaded immediately to the external locations when pre-staged files are not stored in the cache that may be uploaded to external locations to create sufficient free space in the storage area to pre-stage the file for upload to the external locations. The processor may be configured to upload the file to the external location upon a determination that the file can be uploaded immediately and the processor may be configured to generate a failed upload indicator upon a determination that the file can not be uploaded immediately.

In order to determine whether the one or more pre-staged files already stored in the cache may be uploaded to external location, the processor may be configured to determine whether the one or more pre-staged files may be uploaded to external locations based on an amount of network bandwidth available to upload the one or more pre-staged files to external locations; determine whether the one or more pre-staged files may be uploaded to external locations based on a power level associated with a host device; determine whether the one or more pre-staged files may be uploaded to external locations based on at least one of a number of read requests, a number of erases, or a number of writes associated with the storage area of the storage device; determine whether the one or more pre-staged files may be uploaded to external locations based on a security parameter associated with the storage device; and/or determine whether the one or more pre-staged files may be uploaded to external locations based on a number of host applications currently accessing the storage area of the storage device.

In order to determine whether the one or more pre-staged files already stored in cache may be uploaded to external locations, the processor may be configured to query the storage device for one or more metrics associated with the storage area of the storage device and to determine whether the one or more pre-staged files may be uploaded to external locations based on the one or more metrics. The one or more metrics may include at least one of a number of media plays, a number of erases, or a number of writes associated with the storage area of the storage device.

It will be appreciated that in some implementations, one or more processors may be configured to perform the acts described above with respect to FIG. 12 based on instructions stored on a memory such as a computer-readable non-transitory storage medium. The one or more processors may be located on the host, the storage device, or a combination of both.

It is noted that the methodology disclosed herein, of marking files and assigning to them discarding levels in associated file system, may have many useful applications, one of which is restoring a storage usage safety margin to guarantee sufficient storage space for user files. For example, a discarding level assigned to a file may be used to remap file clusters to a lower-performing flash module, or to clear the clusters upon request.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, fewer modules and/or functionally equivalent modules. The present disclosure is relevant to various types of mass storage devices such as SD-driven flash memory cards, flash storage devices, non-flash storage devices, "Disk-on-Key" devices that are provided with a Universal Serial Bus ("USB") interface, USB

Flash Drives (""UFDs"), MultiMedia Card ("MMC"), Secure Digital ("SD"), miniSD, and microSD, and so on. Hence the scope of the claims that follow is not limited by the disclosure herein. It is therefore intended that the foregoing detailed description be regarded as illustrative rather than limiting, and that it be understood that it is the following claims, including all equivalents, that are intended to define the spirit and scope of this invention.

The invention claimed is:

1. A method for managing files with a storage device, the method comprising:
in a host to which a storage device is operatively coupled, wherein the storage device includes a cache for storing one or more discardable files:
identifying a file to be uploaded to an external location;
determining whether sufficient free space exists in the cache to pre-stage the file for upload to the external location;
determining that pre-staging the file for uploading to the external location requires more space than free space exists in the cache;
associating discarding criteria with the file;
determining whether one or more discardable files are stored in the cache that are associated with discarding criteria that is higher than that of the file to be pre-staged:
removing one or more discardable files from the cache that are associated with discarding criteria that is higher than that of the file to be pre-staged to free UP space in the cache for the file to be pre-staged for uploading, starting with the discardable file associated with the highest discarding criteria and proceeding with the discardable file associated with the next highest discarding criteria, in sequence, wherein no more discardable files are removed from the cache than are needed to free up space in the cache for the file to be pre-staged; and
storing the file in the cache upon determining that sufficient free space exists in the cache to pre-stage the file for upload to the external location, wherein pre-staging prepares a file for opportunistically uploading such file in accordance with an uploading policy.

2. The method of claim 1, wherein discardable files in the cache include pre-staged files and unsolicited files, wherein all discardable files can be discarded without notice but pre-staged files are discarded only after they are uploaded to an external location.

3. The method of claim 1, wherein the uploading policy comprises uploading when communication with the external location is off-peak.

4. The method of claim 1, wherein uploading of pre-staged files frees up space in the cache.

5. The method of claim 1, wherein the discarding criteria comprises a priority level.

6. The method of claim 1, further comprising:
determining that, after removing one or more discardable files from the cache, sufficient free space does not exist in the cache to pre-stage the file for upload to the external location;
determining whether one or more pre-staged files already stored in the cache may be uploaded to external locations to create sufficient free space in the cache to pre-stage the file for upload to the external location;
uploading the one or more pre-staged files already stored in the cache upon determining that the one or more pre-staged files may be uploaded to external locations to create sufficient free space in the cache to pre-stage the file for upload to the external location; and
storing the file in the cache after uploading the one or more pre-staged files to external locations.

7. The method of claim 6, further comprising:
determining whether the file can be uploaded immediately to the external location when pre-staged files are not stored in the cache that may be uploaded to external locations to create sufficient free space in the cache to pre-stage the file for upload to the external location;
uploading the file to the external location upon determining the file can be uploaded immediately; and
generating a failed upload indicator upon determining the file can not be uploaded immediately.

8. The method of claim 6, wherein determining whether the one or more pre-staged files already stored in the cache may be uploaded to external locations comprises:
determining whether the one or more pre-staged files may be uploaded to external locations based on an amount of network bandwidth available to upload the one or more pre-staged files to external locations.

9. The method of claim 6, wherein determining whether the one or more pre-staged files already stored in the cache may be uploaded to external locations comprises:
determining whether the one or more pre-staged files may be uploaded to external locations based on a power level associated with a host device.

10. The method of claim 6, wherein determining whether the one or more pre-staged files already stored in the cache may be uploaded to external locations comprises:
determining whether the one or more pre-staged files may be uploaded to external locations based on at least one of a number of read requests, a number of erases, or a number of writes associated with the cache.

11. The method of claim 6, wherein determining whether the one or more pre-staged files already stored in the cache may be uploaded to external locations comprises:
determining whether the one or more pre-staged files may be uploaded to external locations based on a security parameter associated with the storage device.

12. The method of claim 6, wherein determining whether the one or more pre-staged files already stored in the cache may be uploaded to external locations comprises:
determining whether the one or more pre-staged files may be uploaded to external locations based on a number of host applications currently accessing the cache.

13. The method of claim 6, wherein determining whether the one or more pre-staged files already stored in the cache may be uploaded to external locations comprises:
querying the storage device for one or more metrics associated with the cache; and
determining whether the one or more pre-staged files may be uploaded to external locations based on the one or more metrics.

14. The method of claim 13, wherein the one or more metrics comprise at least one of a number of read requests, a number of erases, or a number of writes associated with the cache.

15. A storage system comprising:
a communication interface;
a processor on a host for managing a cache of a storage device, wherein the cache is configured to store one or more discardable files and wherein the processor is configured to:
identify a file to be uploaded over the communication interface to an external location;

determine whether sufficient free space exists in the cache to pre-stage the file for upload to the external location;

determine that pre-staging the file for upload to the external location requires more space than free space exists in the cache;

associate discarding criteria with the file;

determine whether one or more discardable files are stored in the cache that are associated with discarding criteria that is higher than that of the file to be pre-staged;

remove one or more discardable files from the cache that are associated with discarding criteria that is higher than that of the file to be pre-staged to free UP space in the cache for the file to be pre-staged for uploading, starting with the discardable file associated with the highest discarding criteria and proceeding with the discardable file associated with the next highest discarding criteria, in sequence, wherein no more discardable files are removed from the cache than are needed to free up space in the cache for the file to be pre-staged; and store the file in the cache upon determining that sufficient free space exists in the cache to pre-stage the file for upload to the external location, wherein pre-staging prepares a file for opportunistically uploading such file in accordance with an uploading policy.

16. The storage system of claim 15, wherein discardable files in the cache include pre-staged files and unsolicited files, wherein all discardable files can be discarded without notice but pre-staged files are discarded only after they are uploaded to an external location.

17. The storage system of claim 15, wherein the uploading policy comprises uploading when communication with the external location is off-peak.

18. The storage system of claim 15, wherein uploading of pre-staged files frees up space in the cache.

19. The storage system of claim 15, wherein the discarding criteria comprises a priority level.

20. The storage system of claim 15, wherein the processor is further configured to:

determine that, after removing one or more discardable files from the cache, sufficient free space does not exist in the cache to pre-stage the file for upload to the external location;

determine whether one or more pre-staged files already stored in the cache may be uploaded to external locations to create sufficient free space in the cache to pre-stage the file for upload to the external location;

upload the one or more pre-staged files already stored in the cache upon determining that the one or more pre-staged files may be uploaded to external locations to create sufficient free space in the cache to pre-stage the file for upload to the external location; and store the file in the cache after uploading the one or more pre-staged files to external locations.

21. The storage system of claim 20, wherein the processor is further configured to:

determine whether the file can be uploaded immediately to the external location when pre-staged files are not stored in the cache that may be uploaded to external locations to create sufficient free space in the cache to pre-stage the file for upload to the external location;

upload the file to the external location upon determining the file can be uploaded immediately; and generate a failed upload indicator upon determining the file can not be uploaded immediately.

22. The storage system of claim 20, wherein to determine whether the one or more pre-staged files already stored in the cache may be uploaded to external locations, the processor is further configured to:

determine whether the one or more pre-staged files may be uploaded to external locations based on an amount of network bandwidth available to upload the one or more pre-staged files to external locations.

23. The storage system of claim 20, wherein to determine whether the one or more pre-staged files already stored in the cache may be uploaded to external locations, the processor is further configured to:

determine whether the one or more pre-staged files may be uploaded to external locations based on a power level associated with a host device.

24. The storage system of claim 20, wherein to determine whether the one or more pre-staged files already stored in the cache may be uploaded to external locations, the processor is further configured to:

determine whether the one or more pre-staged files may be uploaded to external locations based on at least one of a number of read requests, a number of erases, or a number of writes associated with the cache.

25. The storage system of claim 20, wherein to determine whether the one or more pre-staged files already stored in the cache may be uploaded to external locations, the processor is further configured to:

determine whether the one or more pre-staged files may be uploaded to external locations based on a security parameter associated with the storage device.

26. The storage system of claim 20, wherein to determine whether the one or more pre-staged files already stored in the cache may be uploaded to external locations, the processor is further configured to:

determine whether the one or more pre-staged files may be uploaded to external locations based on a number of host applications currently accessing the cache.

27. The storage system of claim 20, wherein to determine whether the one or more pre-staged files already stored in the cache may be uploaded to external locations, the processor is further configured to:

query the storage device for one or more metrics associated with the cache; and determine whether the one or more pre-staged files may be uploaded to external locations based on the one or more metrics.

28. The storage system of claim 27, wherein the one or more metrics comprise at least one of a number of read requests, a number of erases, or a number of writes associated with the cache.

* * * * *

UNITED STATES PATENT AND TRADEMARK OFFICE
CERTIFICATE OF CORRECTION

PATENT NO.        : 8,549,229 B2                                          Page 1 of 1
APPLICATION NO.   : 12/895397
DATED             : October 1, 2013
INVENTOR(S)       : Joseph R. Meza et al.

It is certified that error appears in the above-identified patent and that said Letters Patent is hereby corrected as shown below:

In the Claims

In column 25, claim 1, line 30, after "to be pre-staged to free" replace "UP" with --up--.

In column 27, claim 15, line 14, after "to be pre-staged to free" replace "UP" with --up--.

Signed and Sealed this
Third Day of December, 2013

Margaret A. Focarino
*Commissioner for Patents of the United States Patent and Trademark Office*